United States Patent [19]
Ohtsuchi et al.

[11] Patent Number: 5,438,229
[45] Date of Patent: Aug. 1, 1995

[54] ULTRASONIC MOTOR AND ULTRASONIC MOTOR CONTROL METHOD

[75] Inventors: Tetsuro Ohtsuchi, Osaka; Masanori Sumihara, Higashi osaka; Osamu Kawasaki, Tsuzuki; Takahiro Nishikura, Ikoma; Katsu Takeda, Osaka; Takashi Nojima, Katano; Katsumi Imada, Osaka, all of Japan

[73] Assignee: Matsushita Electric Industrial Co., Ltd., Osaka, Japan

[21] Appl. No.: 194,334

[22] Filed: Feb. 8, 1994

[30] Foreign Application Priority Data

Feb. 8, 1993 [JP] Japan ................................ 5-019806
May 28, 1993 [JP] Japan ................................ 5-126922

[51] Int. Cl.$^6$ ............................................. H01L 41/08
[52] U.S. Cl. ................................... 310/316; 310/323; 318/116
[58] Field of Search .................... 310/316, 317, 323; 318/116

[56] References Cited

U.S. PATENT DOCUMENTS

| | | | |
|---|---|---|---|
| Re. 34,409 | 10/1993 | Hakamata et al. | 310/316 |
| 4,692,649 | 9/1987 | Izukawa et al. | 310/316 |
| 4,829,209 | 5/1989 | Kawasaki et al. | 310/316 |
| 5,001,404 | 3/1991 | Kataoka | 318/116 |
| 5,004,964 | 4/1991 | Kataoka et al. | 310/316 |
| 5,101,144 | 3/1992 | Hirotomi | 310/316 |
| 5,134,348 | 7/1992 | Izukawa et al. | 318/116 |
| 5,214,339 | 5/1993 | Naito | 310/316 |
| 5,256,928 | 10/1993 | Nishikura et al. | 310/316 |

FOREIGN PATENT DOCUMENTS

| | | |
|---|---|---|
| 63-140677 | 6/1988 | Japan . |
| 4-217882 | 8/1992 | Japan . |
| 5-137355 | 6/1993 | Japan . |

Primary Examiner—Mark O. Budd
Attorney, Agent, or Firm—Wenderoth, Lind & Ponack

[57] ABSTRACT

An ultrasonic motor comprising vibrating body, piezo-electric body for exciting an elastic travelling wave in the vibrating body and moving body driven by the elastic travelling wave provides plural vibration amplitude detection electrodes for detecting an amplitude of vibration of the vibrating body these output signals from which are utilized to identify the magnitude of vibration amplitude of the vibrating body and the ultrasonic motor is controlled using the magnitude of vibration amplitude as a control index.

21 Claims, 28 Drawing Sheets

Fig. 37 PRIOR ART
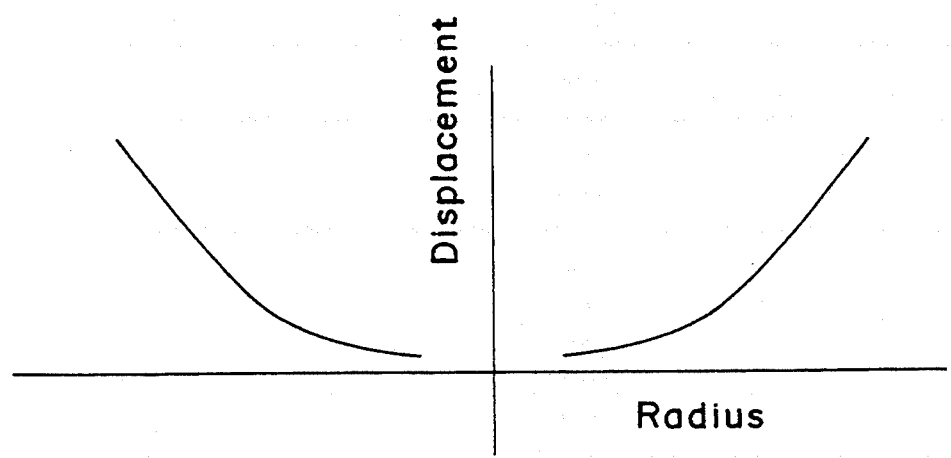
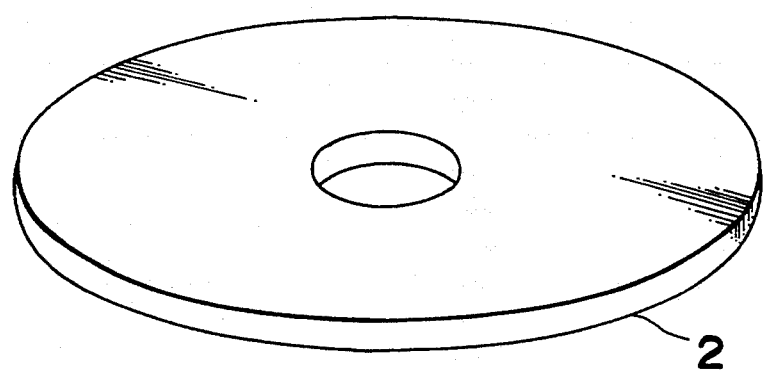

ULTRASONIC MOTOR AND ULTRASONIC MOTOR CONTROL METHOD

BACKGROUND OF THE INVENTION

1. Field of the Invention

The present invention relates to the construction of an ultrasonic motor driven by the elastic vibration excited by a piezoelectric body, and to a control method for said ultrasonic motor.

2. Description of the Related Art

Ultrasonic motors that are driven by exciting elastic vibration in a vibrating body comprised of a piezoelectric ceramic or other piezoelectric body have become widely known in recent years. The operation of such an ultrasonic motor is described below with reference to FIGS. 28, 29 and 30.

FIG. 28 is a partially cut-away view of the basic configuration of a disk-shaped ultrasonic motor wherein a piezoelectric body 2 is affixed to one primary side of a elastic base 1 to form a vibrator 3. Plural projections 1a are provided on the other primary side of the elastic base 1. A moving body 4 is made by laminating a elastic body and a wear-resistant friction member together. The moving body 4 is press-contacted against the vibrator 3. An electric field is applied to the piezoelectric body 2 to induce two standing waves at a 90° phase difference around the circumference of the vibrator 3, thereby exciting travelling waves of a bending vibration and driving the moving body 4 by means of friction.

FIGS. 29 and 30 show the electrode configuration of the piezoelectric body 2 in the above disk-shaped ultrasonic motor configured to excite primary bending vibration in the radial direction and tertiary bending vibration in the circumferencial direction. FIG. 29 is a plan view of side 1 of the piezoelectric body 2 in the above disk-shaped ultrasonic motor, and FIG. 30 is a plan view of side 2 of the piezoelectric body 2 shown in FIG. 28.

Referring to FIG. 30, electrodes DD and EE with a phase difference of ¼ wavelength of the standing wave, and electrode FF equivalent to ½ the travelling wave wavelength, are provided on side 2 of the piezoelectric body 2. Referring to FIG. 29, electrode groups AA and BB with a phase difference of ¼ the travelling wave wavelength, and electrode CC equivalent to ½ the travelling wave wavelength, are formed on side 1 of the piezoelectric body 2. Electrode group AA comprises electrode members aa1 and aa2 equivalent to ½ the travelling wave wavelength, and electrode member aa3 equivalent to ¼ wavelength. Electrode group BB similarly comprises electrode members bb1 and bb2 equivalent to ½ the travelling wave wavelength, and electrode member bb3 equivalent to ¼ wavelength. These electrodes are used to polarize the piezoelectric body 2, and portions of the piezoelectric body 2 corresponding to respective electrode members are polarized in the direction of the thickness thereof oppositely as indicated by the "+" and "−" signs in the figure.

The electrode groups AA and BB and electrode CC on side 1 are positioned relative to the electrodes DD, EE, and FF on side 2. Specifically, if side 1 (FIG. 29) was turned over and placed against side 2 (FIG. 30), electrode group AA would be opposite electrode DD, electrode group BB opposite electrode EE, and electrode CC opposite electrode FF.

The vibrator 3 is formed by bonding side 1 of the piezoelectric body 2 to the elastic base 1. The adhesion face between the piezoelectric body 2 and the elastic base 1 is side 1, as shown in FIG. 31 and the electrodes are flat electrodes. During use, the electrode members of each of electrode groups AA and BB are short-circuited to each other.

If voltage V1, defined by equation 1, and voltage V2, defined by equation 2, are applied from electrodes DD and EE to electrode groups AA and BB, respectively, a travelling wave, defined by equation 3, of bending vibrations is excited in the vibrator 3 from the two standing waves travelling in the circumferential direction.

$$V1 = V0 \sin(\omega t) \quad [1]$$

$$v2 = V0 \cos(\omega t) \quad [2]$$

where V0 is the maximum value of the voltage, $\omega$ is the angular frequency, and t is time $$\xi = \xi 0(\cos(\omega t)\cos(kx) + \sin(\omega t)\sin(kx)) \quad [3]$$

$$= \xi 0(\cos(\omega t - kx))$$

where $\xi$ is the amplitude of the bending vibration, $\xi 0$ is the maximum value of the amplitude of bending vibration, k is the frequency, $\lambda$ is the wavelength, and x is the position.

FIG. 31 includes a cross section of the piezoelectric body 2, and a wave diagram of the standing wave excited by one drive electrode of the piezoelectric body 2 with electrodes as shown in FIGS. 29 and 30. When electrical signals having a 90° time-base phase shift are applied to electrodes DD and EE, standing wave $\tau$ is excited by electrode DD, standing wave $v1$ (solid line) is excited by electrode EE, and the moving body 4 rotates in one direction. When a signal with a −90° time-base phase shift relative to the signal applied to electrode DD is applied to electrode EE, standing wave $v2$ (dotted line) is excited, and the moving body 4 rotates in the opposite direction.

FIG. 32 illustrates the movement of the moving body 4. When the travelling wave is excited, an arbitrary point on the surface of the vibrator 3 moves through an elliptical path having a long axis of 2w and a short axis of 2u. The moving body 4, which is press-contacted against the vibrator 3, contacts the surface of the elastic base 1 near the peak P of this elliptical path, and friction causes the moving body 4 to move in the direction opposite the direction of wave travel at a velocity v, which is defined by equation 4.

$$v = \omega \times u \quad [4]$$

To control the rotational speed of an ultrasonic motor, it is necessary to detect the rotational speed and control the drive signal. Two methods are available for detecting the rotational speed: using an encoder or other detector, or detecting the vibrations set up in the vibrator. Because the amplitude of the vibrations set up in the vibrator is related to the rotational speed, it is possible to control the drive signal and thus control the rotational speed by detecting the vibration of the vibrator.

When a vibration detection electrode is provided on the piezoelectric body, a charge approximately proportional to the amplitude of the vibration induced in the piezoelectric body is produced at the vibration detection electrode of the piezoelectric body. It is therefore possible to detect the amplitude of the vibration set up in the vibrator by detecting the vibration-induced charge of the vibration detection electrode. In the electrode configuration shown in FIGS. 29 and 30, electrode FF is used as the vibration detection electrode. Electrode FF is sized equivalent to ½ the wavelength of standing wave ν1, and is positioned centered on the first ¼ of the second wave of standing wave ν1 (FIG. 31).

A block diagram of rotational speed control in an ultrasonic motor using vibration detection as described above is shown in FIG. 33. An indicator of the magnitude of the amplitude in the vibrator is obtained by detecting the amplitude of the output signal from the vibration detection electrode FF of the piezoelectric body 2. By inputting this value to the control circuit, the drive circuit is adjusted to generate a drive wave yielding the desired rotational speed.

However, with the piezoelectric body having an electrode structure as shown in FIGS. 29 and 30, because both of the standing waves ν1 and ν2 excited by electrode DD have a high or low peak at the center of electrode FF, it is possible to detect, among the elastic travelling waves excited by the piezoelectric body, a component of standing wave ν1 or ν2 using electrode FF.

However, the components of the charges induced by the standing wave τ are mutually cancelled, and the components due to the standing wave τ among those of the elastic travelling wave induced by the piezoelectric body cannot be detected by electrode FF because the standing wave τ excited by electrode EE has a node at the center of electrode FF, and the amplitude of the standing wave τ at each end of electrode FF has the same magnitude but opposite sign.

When a change in the load that is different at electrodes DD and EE occurs, the vibration detection signal from electrode FF can respond to changes on one electrode DD side, but cannot also reflect changes on the other electrode EE side.

The effect of this change in the load is described more generally below.

Shift δt to time, shift δx to position, and shift m to amplitude as shown in equation 5 occur for a variety of reasons in the elastic travelling wave exciting the vibrator, and standing wave components often remain.

$$\xi = \xi_0 (\cos (\omega t) \cos (kx) + m\xi_0 \sin (\omega t + \delta t) \sin (kx + \delta x) \quad [5]$$

Shift δt with respect to time is often due to differences in the impedance of piezoelectric bodies and other such differences, while shift δx to position is usually due to such factors as an offset in the electrode pattern. Shift m to amplitude is generally due to varieties in the composition of the piezoelectric bodies or drive circuits.

In addition, because the vibration detection electrode and drive electrode are provided on the opposite side of the piezoelectric body on which the polarization electrodes used to generate the standing waves are provided, it is difficult to precisely position the electrodes on the piezoelectric body during manufacture, and an offset easily occurs. When the vibration detection electrode is offset from the specified position, its position relative to the standing waves set up in the vibrator is also offset.

When there are residual standing wave components and the position of the vibration detection electrode is offset, the output from the vibration detection electrode changes dependent upon the direction of ultrasonic motor rotation (FIG. 34) even though the frequency of the elastic travelling wave-induced elliptical vibration of the vibrator remains the same and the rotational speed remains the same when the direction of rotation changes. In the case shown in FIG. 32, the amplitude of the vibration detection electrode output is smaller during counterclockwise rotation when compared with clockwise rotation.

FIG. 35 is a graph of the relationship between the position offset of the vibration detection electrode and the ratio between outputs from the vibration detection circuit during counterclockwise and clockwise rotation for a given time shift δt. When the offset of the vibration detection electrode increases, the difference in the amplitude due to rotation direction becomes pronounced.

When the direction of rotation is reversed by inputting drive signals with the same amplitude but a phase shifted by −90°, the output amplitude from the vibration detection signal changes greatly.

FIG. 35 shows a graph of the relationship the rotational speed and the output amplitude from the vibration detection electrode in an ultrasonic motor having an offset vibration detection electrode. As shown therein, the rotational speed is different depending on the direction of rotation though it is proportional to the amplitude irrespectively to the direction of rotation.

In FIG. 35, the amplitude in the clockwise rotation becomes smaller than that in the counter clockwise rotation at the same rotational speed. This is due to many factors such as position offset of the vibration detection electrode to the standing wave, unevenness of the press contact of the moving body and so on, as stated in the above. Due to these reasons, the rotational speed varies greatly depending on the rotational speed in a conventional ultrasonic motor as mentioned above and it does not correspond to the amplitude one to one. Accordingly, the conventional ultrasonic motor has a disadvantage in that it is impossible to control the rotational speed using the output amplitude from the vibration detection electrode.

To avoid this, the vibration detection electrode must be precisely positioned relative to the standing wave.

Furthermore, a common potential is required to apply the drive signal to two drive electrodes on the piezoelectric body and generate a field in the thickness direction of the piezoelectric body. In general, the ground potential is used as the common potential and is connected to leads on the elastic base, which is often metal, to provide the common potential. Flexible leads are also used to connect the drive electrodes and vibration detection electrode on the piezoelectric body with an external circuitry. A common electrode electrically connected to the elastic base is also provided on the piezoelectric body to simplify connection, and the common potential is often obtained from this common electrode through the flexible leads. The leads and common electrode of the piezoelectric body are connected using the elastic base bonding the piezoelectric body or part of the circumference of the drive electrode of the piezoelectric body as the common electrode.

If when the leads are connected to the flexible base of the vibrator the connection is made at the outside circumference of the vibrator, when the vibrator is excited in an vibration mode wherein the outside circumference is the free end (See FIG. 37), the mass of the lead wires and connector parts prevents vibration and drive efficiency drops. If connection between the elastic base and lead is made using a heating process, the entire vibrator is affected by the heating, and the polarization state of the piezoelectric body is also affected.

SUMMARY OF THE INVENTION

Therefore, an object of the present invention is to provide a high efficiency ultrasonic motor and ultrasonic motor control method whereby the difference between the vibration detection electrode output signals dependent upon the direction of rotation is reduced, the rotational speed of the ultrasonic motor can be stably controlled, vibration of the vibrator is not inhibited, and there is no deterioration of vibration characteristics even when a biased load fluctuation occurs, standing wave components remain, and the position of the vibration detection electrode is shifted from the specified position.

To achieve this object, an ultrasonic motor according to the present invention comprises a drive electrode and plural vibration detection electrodes on the piezoelectric body. The amplitude of vibration or a value relative to the amplitude is detected by the vibration detection circuit from the signals output by the vibration detection electrodes, and the drive signal is controlled using a numeric sum obtained by adding these values to control the rotational speed.

Alternatively, one vibration detection electrode is selected among the vibration detection electrodes according to the direction of travel of the elastic travelling wave excited by the vibrator and the signal output from the selected vibration detection electrode is used to control the drive signal and, accordingly, the rotational speed.

This ultrasonic motor may further comprise a common electrode near the inside circumference of the piezoelectric body in addition to the drive electrode and plural vibration detection electrodes provided on the piezoelectric body.

By using the sum of the output amplitude values from the plural vibration detection electrodes of the piezoelectric body for drive signal control, the sum value will not change greatly with the change in the direction of rotation even when standing wave components remain in the elastic travelling wave exciting the vibrator and the position of the vibration detection electrode relative to the standing wave is offset. This sum value can thus be used for rotational speed control of the ultrasonic motor.

Furthermore, by selecting the vibration detection electrode according to the direction of rotation, stable speed control unaffected by the load fluctuation between the drive electrodes can be achieved.

By providing the common electrode at the inside diameter area where the vibration is least, interference of the lead wire connection with vibration can be minimized, and a high efficiency drive can be obtained.

By placing the drive electrodes and vibration detection electrodes of the piezoelectric body as described above, it is possible to provide an ultrasonic motor wherein the drive electrode area can be increased, the vibration detection output can be maintained at a high level, and the rotational speed can be stably and precisely controlled using the vibration detection signal without needs of precise electrode positioning, without being affected by residual components of the elastic travelling wave, and without using an encoder.

BRIEF DESCRIPTION OF THE DRAWINGS

These and other objects and features of the present invention will become clear from the following description taken in conjunction with the preferred embodiments thereof with reference to the accompanying drawings throughout which like parts are indicated by like reference numerals, and in which:

FIG. 37 illustrates vibration in the radial direction.

DETAILED DESCRIPTION OF THE PREFERRED EMBODIMENTS Embodiment 1

Figure 1:
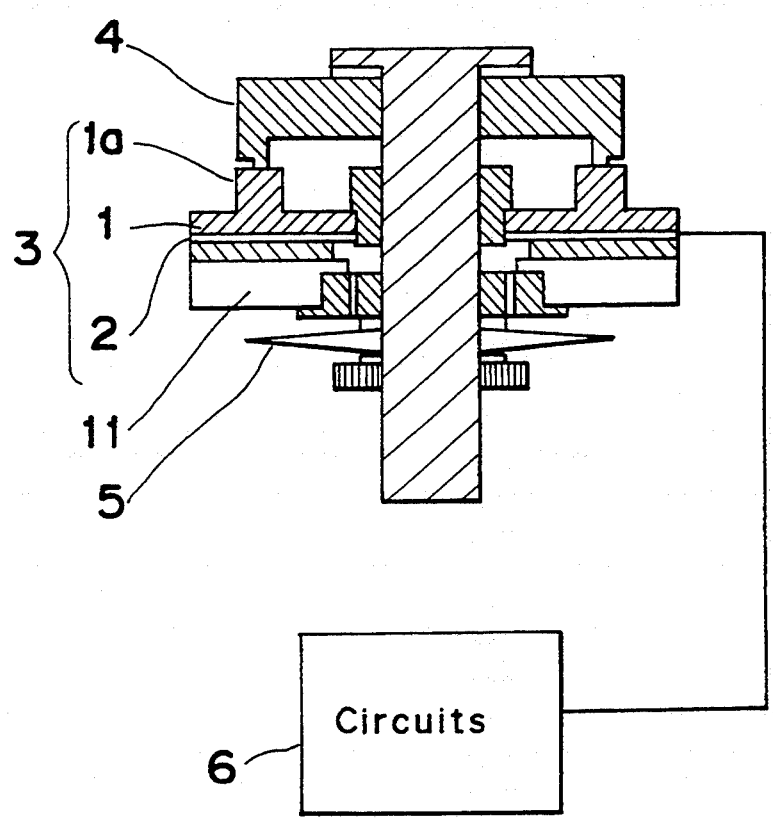
FIG. 1 is a cross section of an ultrasonic motor according to the preferred embodiment of the invention.

The first embodiment of an ultrasonic motor according to the invention is described below with reference to the accompanying figures, of which FIG. 1 is a cross section of the overall ultrasonic motor structure according to the first embodiment.

This ultrasonic motor comprises a vibrator 3 made by bonding a piezoelectric body 2 to one main side of a elastic base 1 with projections 1a provided on the other main side of the elastic base 1. A moving body 4 to be driven by the vibrator 3 is made of an elastic material such as a metal and has a friction surface made of a wear-resistant material. The friction surface of moving body 4 is press-contacted against the vibrator 3 biased by a pressure spring 5. The circuitry 6 comprises a drive circuit, control circuit, amplitude detection circuit, as will be explained later, and adder circuit, and is connected to the electrodes of the piezoelectric body 2. The elastic base 1 is used as the reference potential, and is electrically connected to external circuit elements. The piezoelectric body 2 generates two standing waves with a 90° phase offset in the circumferential direction of the vibrator 3 by applying an electrical field from the circuitry, thus exciting a bending vibration travelling wave to drive the moving body 4 by contact friction.

Figure 2:
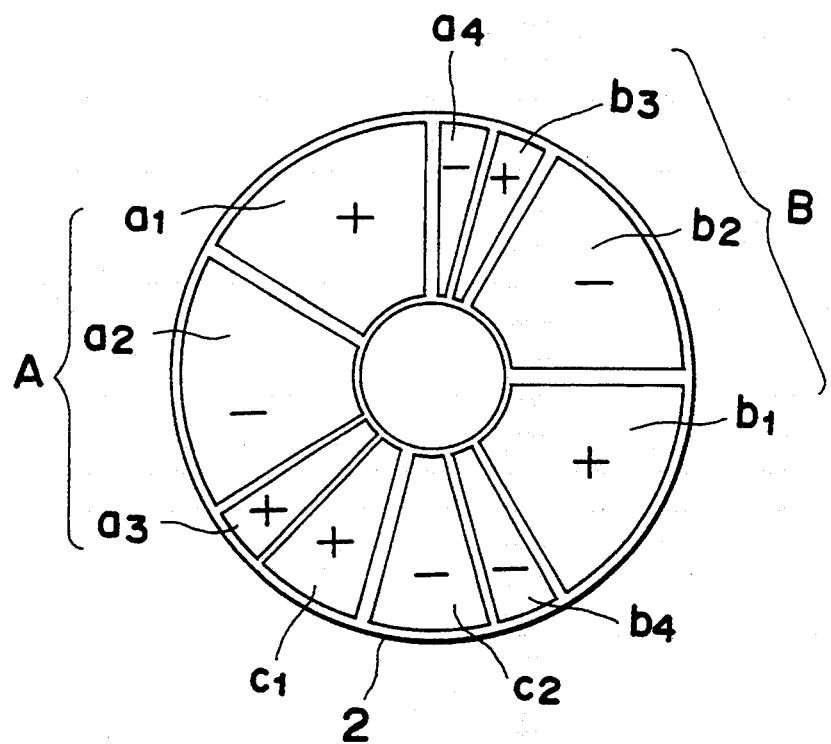
FIG. 2 is a plan view of side one of the piezoelectric body in a disk-shaped ultrasonic motor according to the first embodiment of the present invention.
Figure 3:
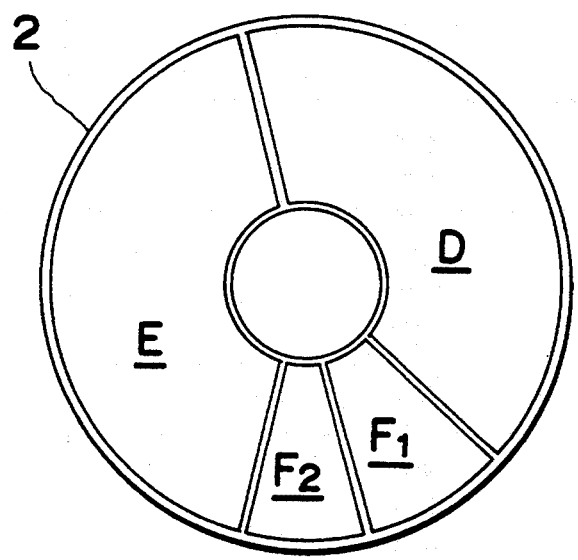
FIG. 3 is a plan view of side two of said piezoelectric body.

FIG. 2 is a plan view of side 1 of the piezoelectric body 2 in the disk-shaped ultrasonic motor shown in FIG. 1, and FIG. 3 is a plan view of side 2 of the piezoelectric body 2 shown in FIG. 2. Fundamental and third mode flexural vibrations are excited in the radial and circumferential directions of the disk-shaped vibrator, respectively.

Figure 4:
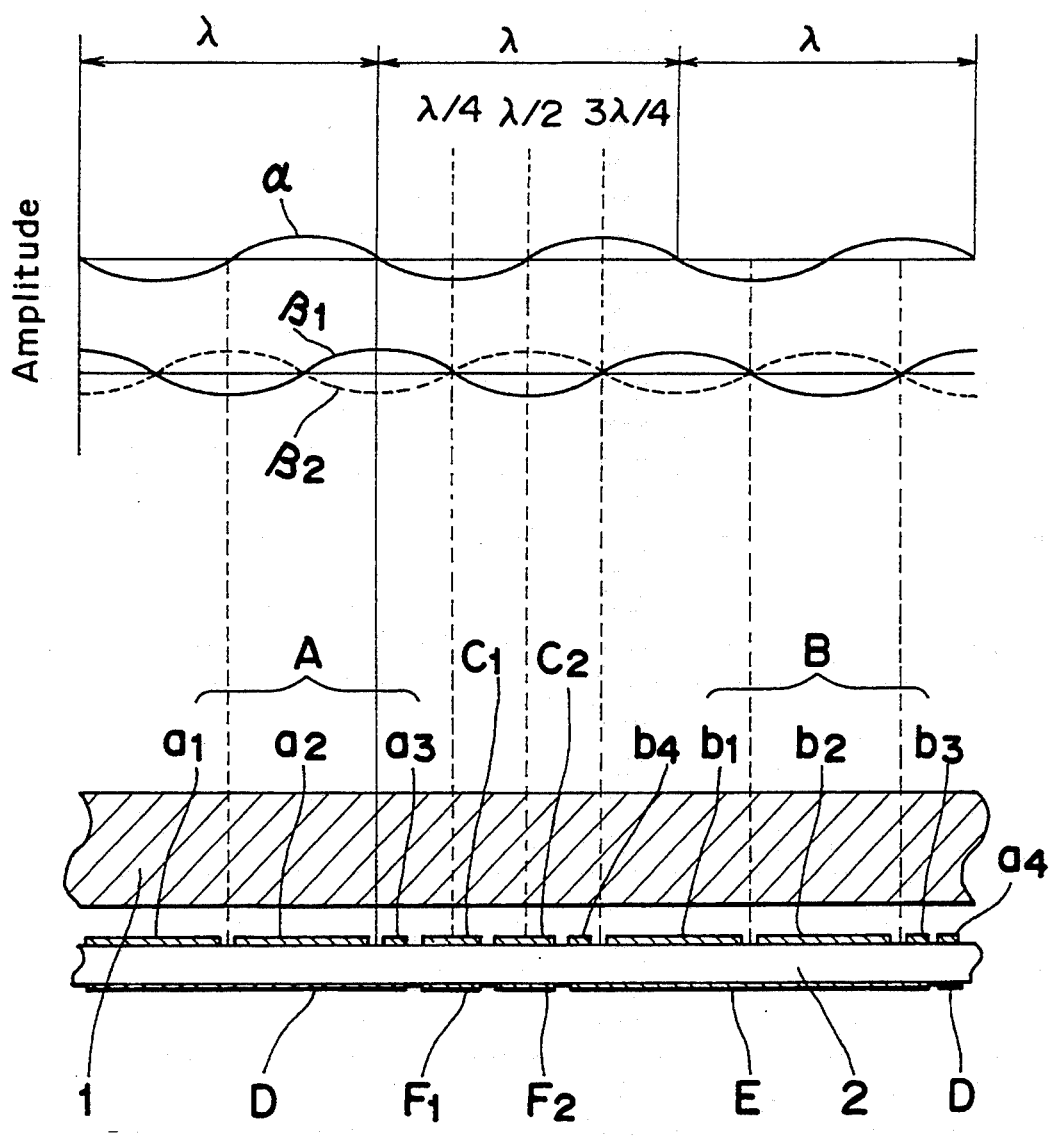
FIG. 4 shows the relationship between the standing waves and piezoelectric body of the ultrasonic motor according to the preferred embodiment of the invention.

FIG. 4 includes a cross section of the piezoelectric body 2, and a wave diagram of the standing waves $\alpha$, $\beta 1$ and $\beta 2$ excited by the drive electrodes of the piezoelectric body 2; $\lambda$ indicates the wavelength of each standing wave.

Referring to FIG. 3, side 2 of the piezoelectric body 2 comprises electrodes D and E positioned with a phase difference equivalent to $\frac{1}{4}$ wavelength of the travelling wave, and electrodes F1 and F2 equivalent to $\frac{1}{4}$ the travelling wave wavelength. Referring to FIG. 2, side 1 of the piezoelectric body 2 comprises electrode groups A and B positioned with a phase difference equivalent to $\frac{1}{4}$ wavelength of the travelling wave, and electrodes C1 and C2 equivalent to $\frac{1}{4}$ the travelling wave wavelength. Electrode group A comprises electrode members a1 and a2 sized to be equivalent to $\frac{1}{4}$ the travelling wave wavelength, and electrode members a3 and a4 equivalent to $\frac{1}{8}$ wavelength. Electrode group B similarly comprises electrode members b1 and b2 sized equivalent to $\frac{1}{4}$ the travelling wave wavelength, and electrode members b3 and b4 with a $\frac{1}{8}$ wavelength equivalent.

Electrode groups A and B and electrodes C1 and C2 on side 1 correspond to electrodes D, E, F1, and F2 on side 2. Specifically, if side 1 (FIG. 2) was turned over and placed against side 2 (FIG. 3), electrode group A would be opposite electrode D, electrode group B opposite electrode E, electrode C1 opposite electrode F1, and electrode C2 opposite electrode F2.

When the piezoelectric body 2 is polarized, side 2 acts as a common electrode by being placed in contact with a metal conductor, and the piezoelectric body 2 is polarized as indicated by the signs in FIG. 2 using the electrode members of electrode groups A and B and electrode D on side 1.

After polarization, the piezoelectric body 2 is bonded to the elastic base 1 using side 1 as the adhesion interface, thus forming the vibrator 3.

Note that polarization is not limited to the pattern shown in FIG. 2.

When electrical signals with a 90° time-base phase difference are applied to electrodes D and E positioned with a 90° phase difference on the piezoelectric body 2, fundamental and third mode flexural vibrations can be excited in the radial and circumferential directions of the vibrator 3, respectively.

Therefore, because the electrodes used by the piezoelectric body 2 to drive the vibrator are electrodes D and E and only electrodes F1 and F2 are not used as drive electrodes, the disk area not used for motor drive is only equivalent to $\frac{1}{2}$ the standing wave wavelength, and a high drive power can be obtained.

When 90° time-base phase difference electrical signals are applied to electrodes D and E, a standing wave comprising an elastic travelling wave excited in the vibrator 3 is generated as shown in FIG. 4.

When 90° time-base phase difference electrical signals are applied to electrodes D and E, a standing wave $\alpha$ is excited by electrode D and standing wave $\beta 1$ (solid line) is excited by electrode E. Standing wave $\beta 2$ (dotted line) is excited when the electrical signal applied to electrode E has a $-90°$ time-base phase difference to the electrical signal applied to electrode D. The direction of moving body rotation induced by standing wave $\beta 2$ (dotted line) is opposite the direction induced by standing wave $\beta 1$ (solid line). The direction of rotation is thus controlled by the signal applied to electrode E.

Electrodes F1 and F2 are used as the vibration detection electrodes. As shown in FIG. 4, electrode F1 is sized equivalent to the ¼ wavelength from ⅛ to ⅜ wavelength of the second wave of standing wave e, and is positioned centered at the end of the first ¼ wavelength of this second wave. Electrode F2 is sized equivalent to the ¼ wavelength from ⅜ to ⅝ wavelength of the second wave of standing wave α, and is positioned centered at the wave transition point. In other words, the vibration detection electrodes are positioned corresponding to a ¼-wavelength period of the standing wave, and are respectively centered on the low peaks of the two standing waves α and β.

Figure 5:
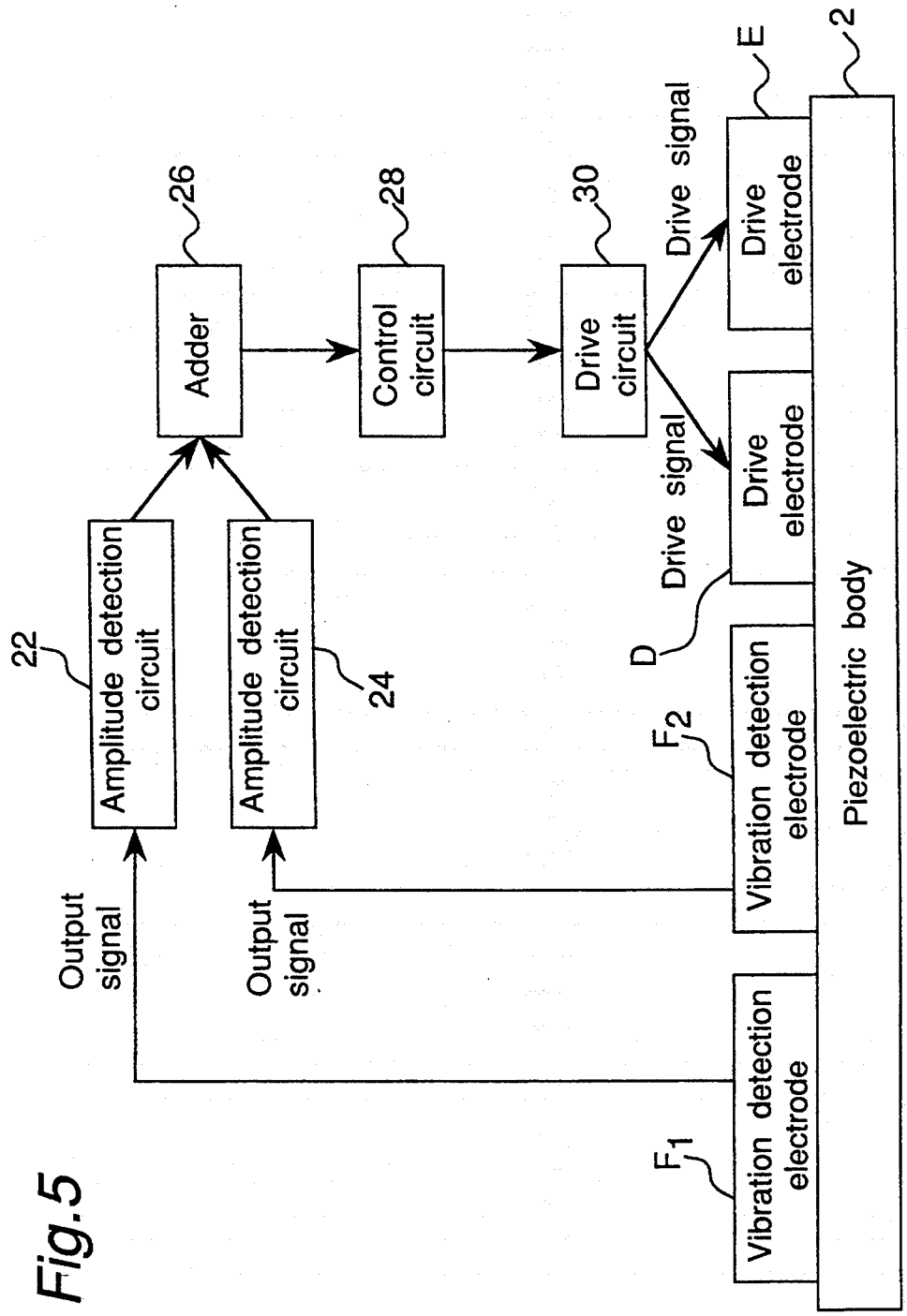
FIG. 5 is a block diagram of the control method of the ultrasonic motor according to the preferred embodiment of the invention.
Figure 34:
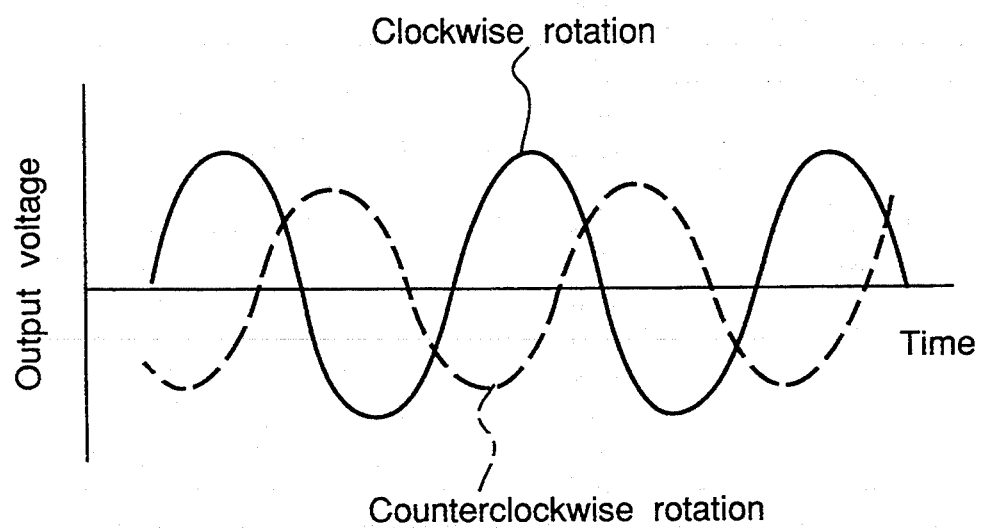
FIG. 34 is a graph of the vibration detection signal in a conventional ultrasonic motor.
Figure 35:
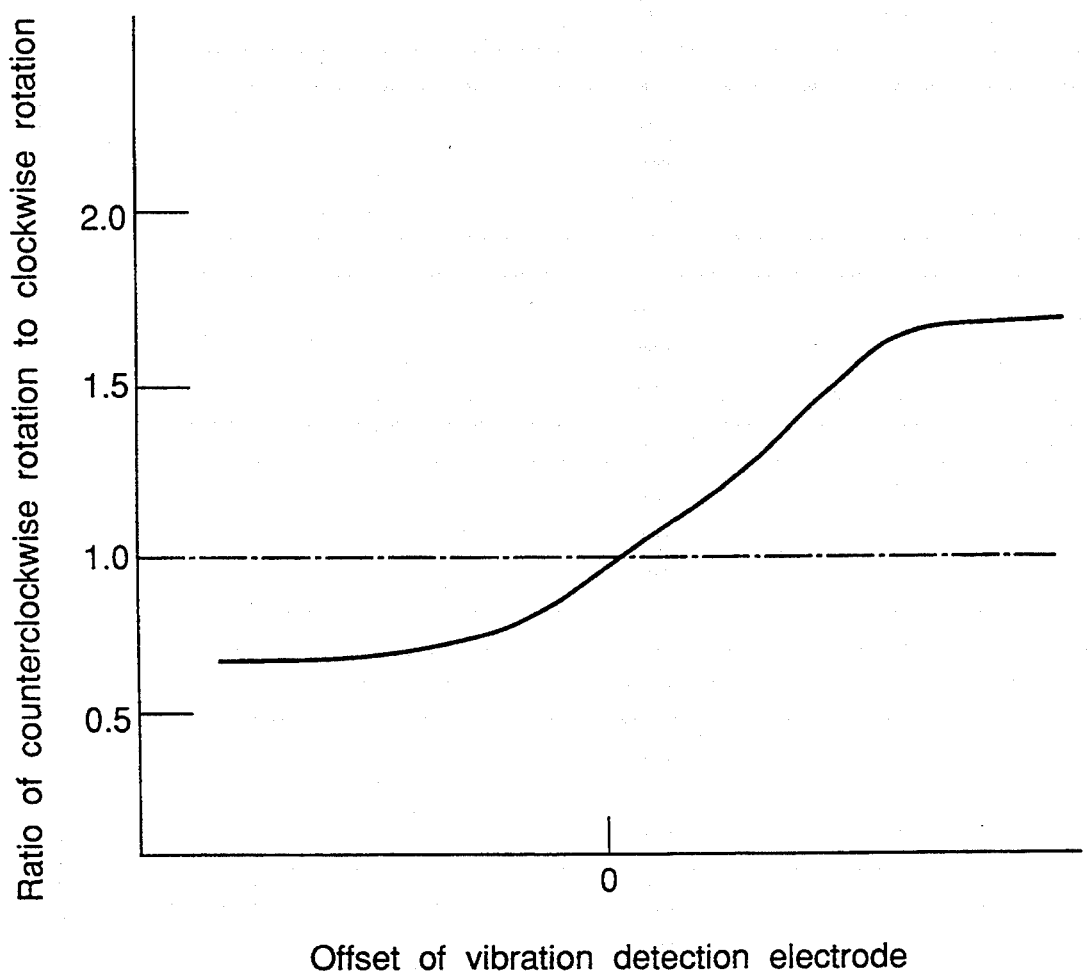
FIG. 35 is a graph of the vibration detection results of a conventional ultrasonic motor.

FIG. 5 is a block diagram of the rotational speed control implemented by the circuitry 6 of the present embodiment using vibration detection. Electrical signals with a charge induced by vibration of the vibrator are extracted from electrodes F1 and F2 on side 2 of the piezoelectric body. The electrical signals obtained from electrodes F1 and F2 are AC signals that change with time as shown in FIG. 34. These signals are sent to the amplitude detection circuits 22 and 24, and the amplitude of vibration is thereby detected.

The amplitude detection circuits 22 and 24 each comprise a rectifier circuit (not shown), and detect the peak-peak value of the input signal (the maximum amplitude of the input signal) as a DC voltage. These two DC voltages are input to an adder 26 and summed. The summed DC voltage is output to a control circuit 28, which uses the DC voltage as an index for drive circuit control. The drive circuit 30 is controlled by the control circuit 28 to output a drive signal of which the frequency, voltage, and other parameters have been adjusted to drive the moving body at the desired rotational speed.

The amplitude detection circuits 22 and 24 may use half-wave rectification circuits, converting ½ of the amplitude (peak to ground) of the vibration detection electrode output signal to a DC voltage expressing the amplitude of vibration.

It is also possible to integrate the vibration detection electrode output signal for a predetermined period, convert the integrated value to a DC voltage, and add the resulting DC voltages.

Alternatively, the voltages detected by the amplitude detection circuit can be analog/digital converted and the resulting digital values added. The resulting digital sum can be used by the control circuit to control the drive signal, and can be easily manipulated as a control index for digital control.

It is to be noted that the method for detecting vibrations generated in the vibrator from the vibration detection electrode output signals shall not be limited to that described above.

Figure 6:
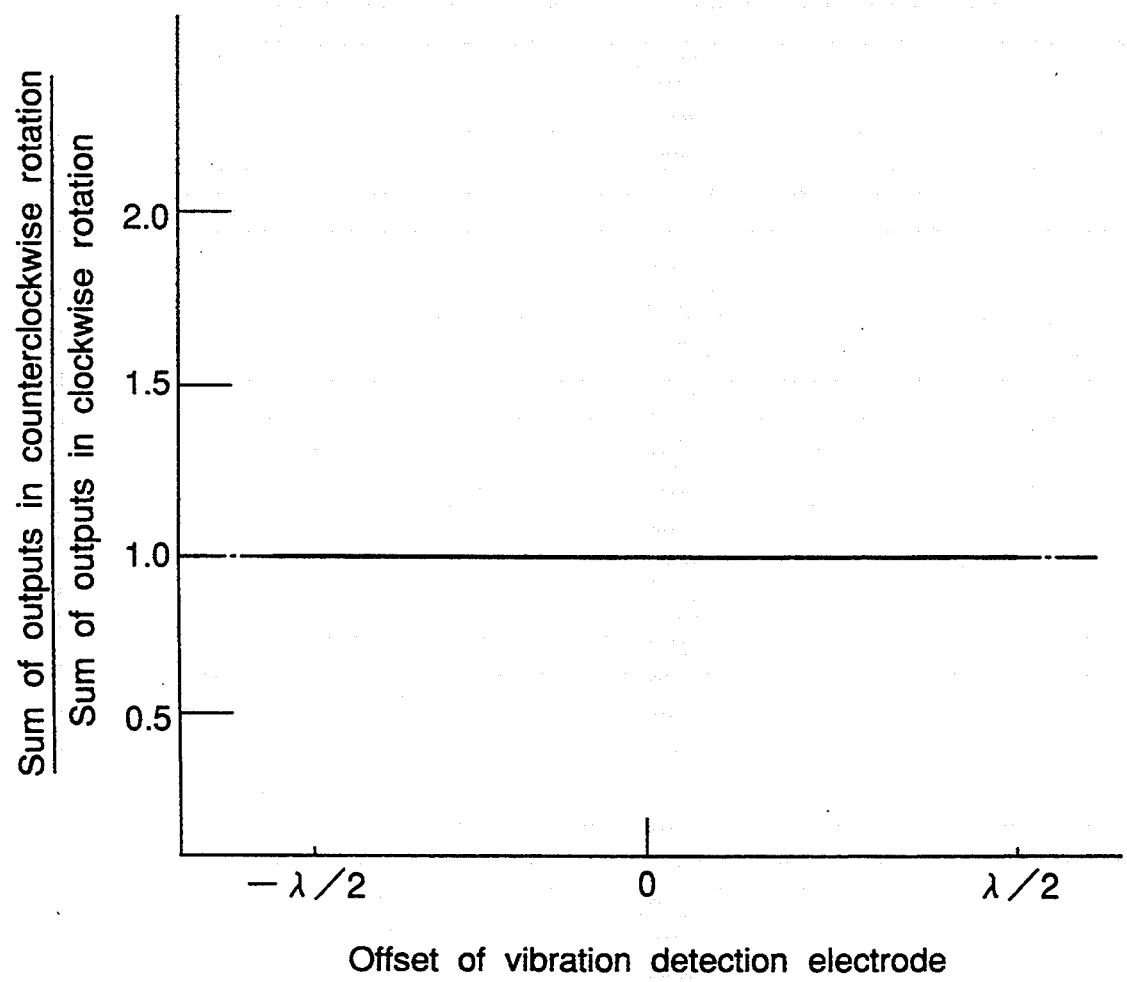
FIG. 6 is a graph of the vibration detection results in the ultrasonic motor according to the preferred embodiment of the invention.

FIG. 6 is a graph showing the relationship between the physical offset of the vibration detection electrodes F1 and F2 to the standing waves, and the ratio between the amplitude sum signals during clockwise and counterclockwise rotation. More specifically, this is the ratio between the sum of the amplitude detection circuit output signals, which are obtained from the output signals from the vibration detection electrodes F1 and F2, during clockwise rotation to the sum of the amplitude detection circuit output signals during counterclockwise rotation when using a piezoelectric body with an electrode structure as shown in FIGS. 2 and 3. In this case, the shift δt to time is the same irrespective of the direction of rotation. As shown in FIG. 6, there is no directional dependency of the sum even when there is a large physical offset of the vibration detection electrodes to the standing wave. As a result, drive signals with the same amplitude (without specific amplitude control being applied) and a variable phase relationship dependent upon the direction of rotation are input to the drive electrodes to generate elastic travelling waves (which differ only in direction dependent upon the direction of rotation) in the vibrator, thereby enabling the rotational speed to be controlled with good precision irrespective of the direction of rotation because the sum does not change with the direction of rotation even when there are residual standing wave components and a physical offset in the electrode position(s).

Figure 7:
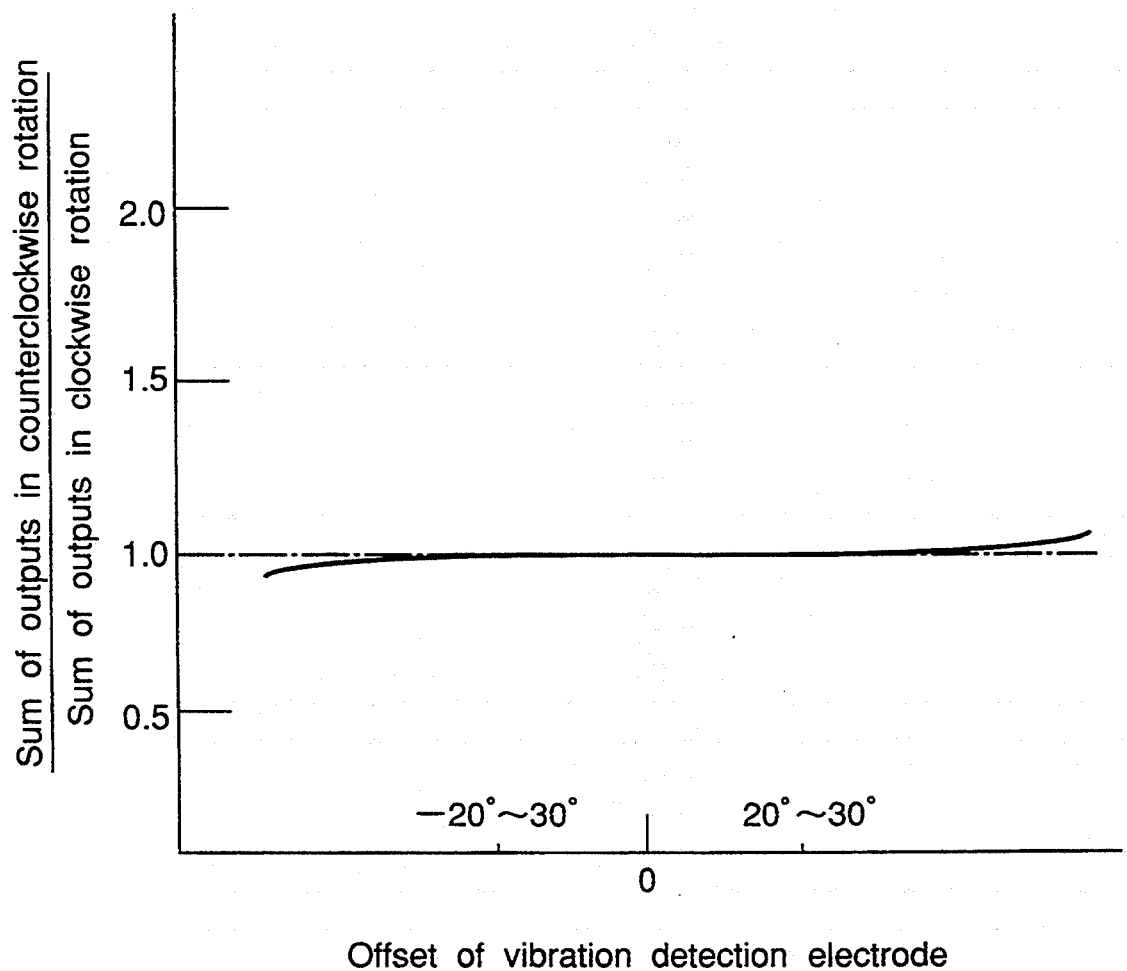
FIG. 7 is a graph of the vibration detection results in the ultrasonic motor according to the preferred embodiment of the invention.

FIG. 7 shows the relationship between the physical offset of the vibration detection electrodes F1 and F2 to the standing waves, and the ratio between the sum of the amplitude detection circuit output signals for the input signals from vibration detection electrodes F1 and F2 obtained during clockwise rotation to the sum of the amplitude detection circuit output signals obtained during counterclockwise rotation when the time-based polarization δt differs with the direction of rotation. In this case, too, the signal sums are nearly constant irrespective of the direction of rotation and the physical offset of the vibration detection electrodes.

Figure 8:
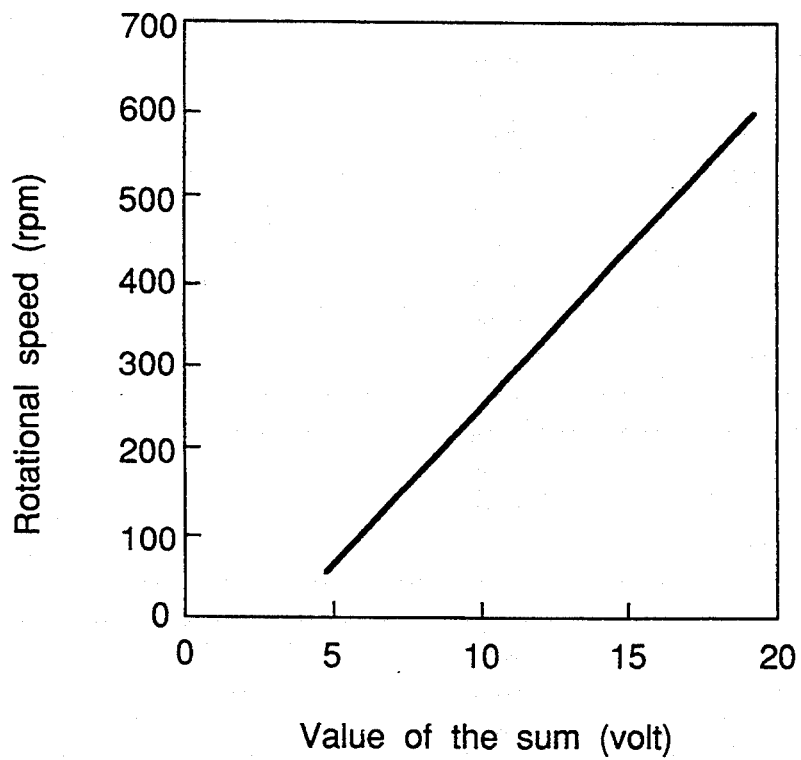
FIG. 8 shows a graph of relationship between the sum of outputs from the vibration detection electrodes and the rotational speed.
Figure 36:
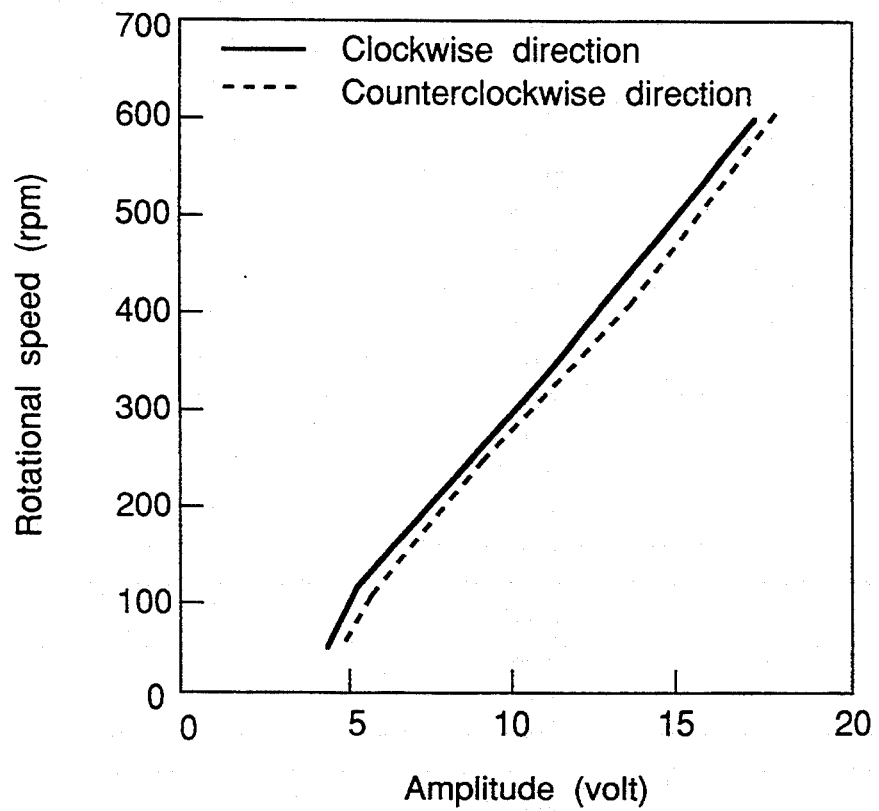
FIG. 36 is a graph showing variation of the rotational speed depending on the direction of rotation.

FIG. 8 shows a relationship between the rotational speed of the ultrasonic motor using the piezoelectric body having such a structure of electrodes as shown in FIGS. 2 and 3 and a summed value of outputs from the vibration detection electrodes. As is apparent from comparison of FIG. 8 with FIG. 36, according to the present embodiment of the present invention, the rotational speed is proportional to the summed value irrespective to the direction of rotation. Thus, the rotational speed and the summed value of vibration amplitudes correspond one to one, thereby enabling to utilize the summed value as an index of the rotational speed. This relationship between the rotational speed and the summed value is stored in a memory of the control circuit 28 (of FIG. 5) beforehand. When a desired rotational speed is input to the control circuit 28, the latter seeks for a summed value corresponding to the input rotational speed and controls the drive signal so as to coincide the output from the adder 26 with the summed value having been sought. In general, frequency and voltage of the drive signal are varied to vary the rotational speed of an ultrasonic motor. The vibration amplitude of the vibrator becomes large as the frequency of the drive signal approaches the resonance frequency of the vibrator and, thereby, the rotational speed becomes large. Accordingly, the frequency or voltage of the drive signal is varied by the control circuit so that the summed value of outputs from the vibration detection electrodes coincides with the value corresponding to the desired rotational speed.

Thus, the rotational speed can be controlled with good precision irrespective of the direction of rotation even when using a different electrode structure by using the sum of the outputs from the vibration detection circuits. Note that this is possible insofar as the physical relationship between the vibration detection electrode positions and the two standing waves is as shown in FIG. 4 according to the present embodiment.

An ultrasonic motor and control method providing extremely stable, high precision rotational speed control unaffected by any physical offset between the vibration detection electrodes and residual standing wave components in the elastic travelling wave can be provided.

Embodiment 2

The second embodiment of the invention is described below with reference to the accompanying figures.

Figure 9:
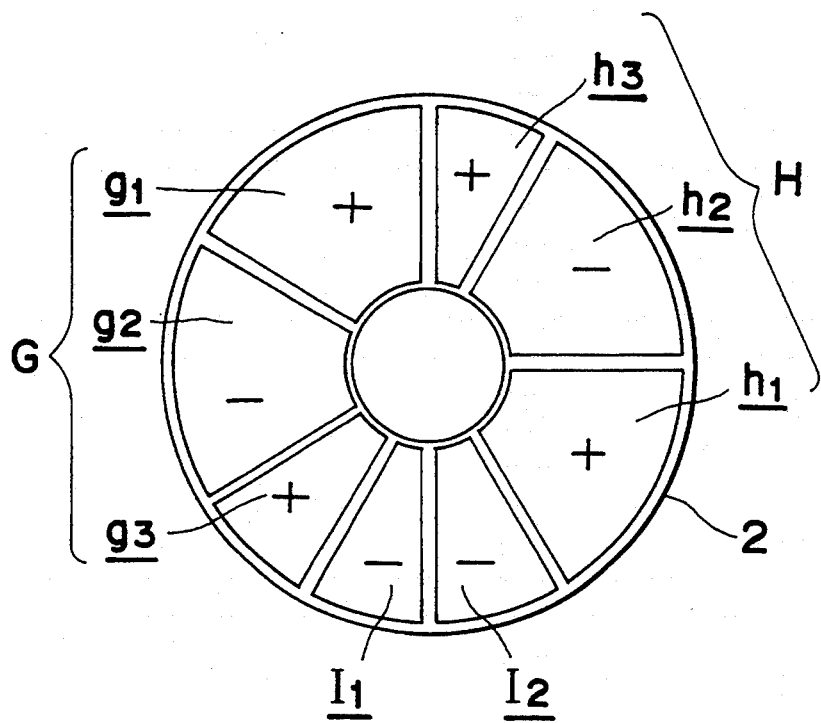
FIG. 9 is a plan view of side one of the piezoelectric body in a disk-shaped ultrasonic motor according to the second embodiment of the present invention.
Figure 10:
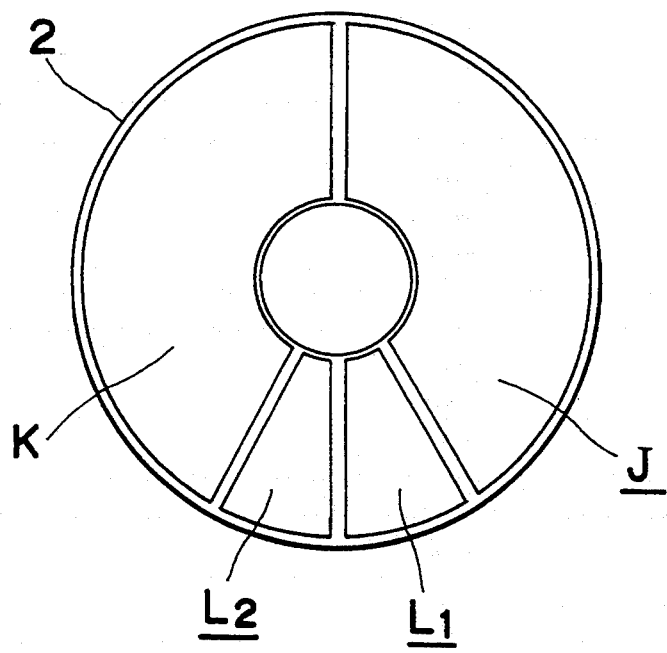
FIG. 10 is a plan view of side two of said piezoelectric body.

FIG. 9 is a plan view of side 1 of the piezoelectric body 2 in the disk-shaped ultrasonic motor, and FIG. 10 is a plan view of side 2 of the piezoelectric body 2. Fundamental and third mode flexural vibrations are excited in the radial and circumferential directions of the disk-shaped vibrator, respectively.

Figure 11:
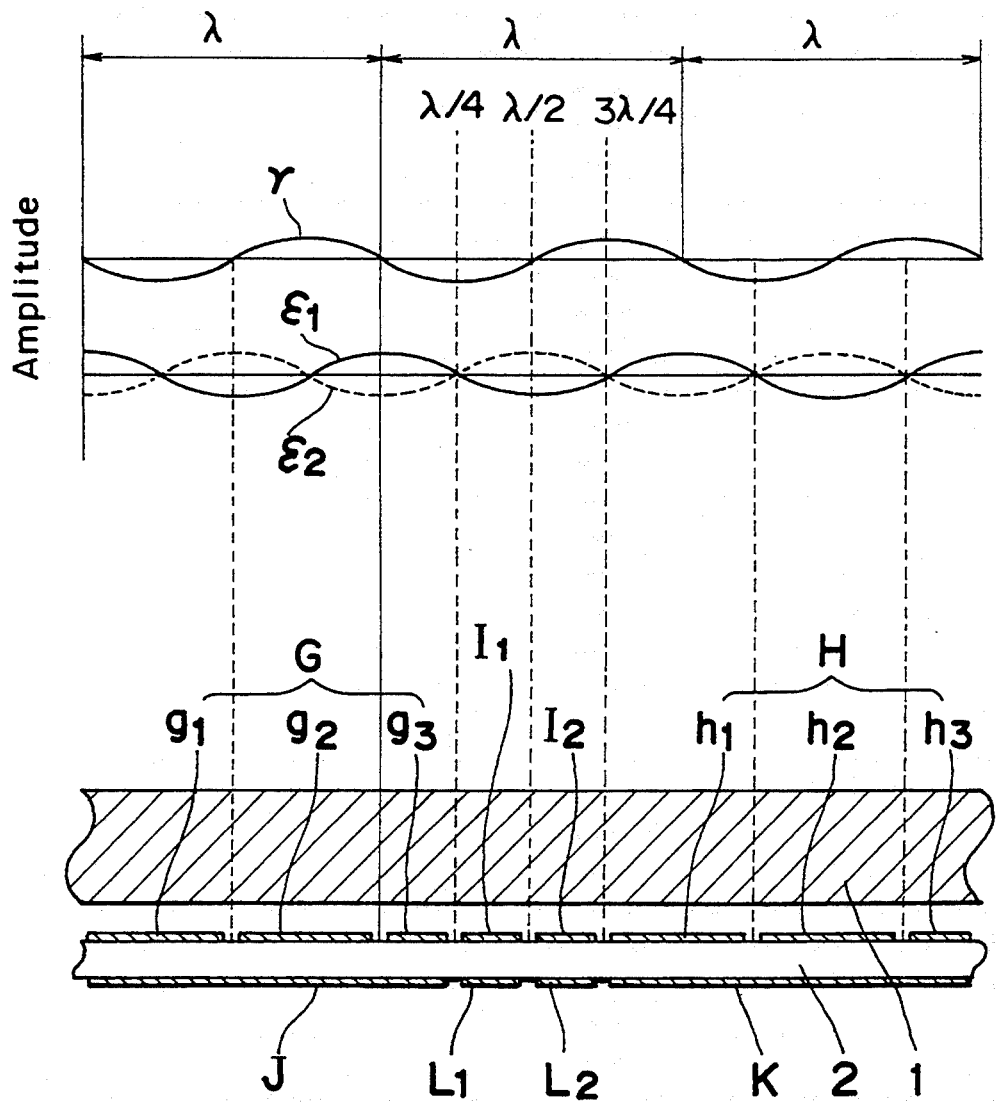
FIG. 11 shows the relationship between the standing waves and piezoelectric body of the ultrasonic motor according to the second embodiment of the invention.

FIG. 11 includes a cross section of the piezoelectric body 2, and a wave diagram of the standing waves $\gamma$, $\epsilon 1$ and $\epsilon 2$ excited by the drive electrodes of the piezoelectric body 2; $\lambda$ indicates the wavelength of the standing wave.

Referring to FIG. 10, side 2 of the piezoelectric body 2 comprises electrodes K and J positioned with a phase difference equivalent to $\frac{1}{4}$ wavelength of the travelling wave, and electrodes L1 and L2 equivalent to $\frac{1}{4}$ the travelling wave wavelength. Referring to FIG. 9, side 1 of the piezoelectric body 2 comprises electrode groups G and H positioned with a phase difference equivalent to $\frac{1}{4}$ wavelength of the travelling wave, and electrodes I1 and I2 equivalent to $\frac{1}{4}$ the travelling wave wavelength. Electrode group G comprises electrode members g1 and g2 sized to be equivalent to $\frac{1}{2}$ the travelling wave wavelength, and electrode member g3 equivalent to a $\frac{1}{4}$ wavelength. Electrode group H similarly comprises electrode members h1 and h2 sized to be equivalent to $\frac{1}{2}$ the travelling wave wavelength, and electrode member h3 with a $\frac{1}{4}$ wavelength equivalent.

Electrode groups G and H and electrodes I1 and I2 on side 1 correspond to electrodes J, K, L1, and L2 on side 2. Specifically, if side 1 (FIG. 9) was turned over and placed against side 2 (FIG. 10), electrode group G would be opposite electrode J, electrode group H opposite electrode K, electrode I1 opposite electrode L1, and electrode I2 opposite electrode L2.

By placing the piezoelectric body 2 with side 2 on the metal conductor, the electrode members of electrode groups G and H and electrode I on side 1 are polarized to the signs shown in FIG. 9 as common electrodes. Even when the electrodes on side 1 are small, the electrodes are sized to a $\frac{1}{4}$ wavelength equivalent, and polarization is therefore easier than in the previous embodiment.

After polarization, the piezoelectric body 2 is bonded to the elastic base 1 using side 1 as the adhesion interface, thus forming the vibrator 3.

Note that polarization is not limited to the pattern shown in FIGS. 9 and 10.

The elastic base is connected as the reference potential to an external circuitry.

When electrical signals with a 90° time-base phase difference are applied to electrodes J and K positioned with a 90° physical phase difference on the piezoelectric body 2, fundamental and third mode flexural vibrations can be excited in the radial and circumferential directions of the vibrator 3, respectively.

A high drive power can be obtained because the electrodes used for drive occupy 5/6 of the disk area.

FIG. 11 shows the standing waves forming the elastic travelling waves excited in the vibrator 3 when electrical signals with a 90° time-base phase difference are applied to electrodes J and K.

When electrical signals with a 90° time-base phase difference are applied to electrodes J and K, standing wave $\gamma$ is excited by electrode J, and standing wave $\epsilon 1$ (solid line) is excited by electrode K. Standing wave $\epsilon 2$ (dotted line) is excited when the electrical signal applied to electrode K has a $-90°$ time-base phase difference to the electrical signal applied to electrode J. The direction of moving body rotation induced by standing wave $\epsilon 2$ (dotted line) is opposite the direction induced by standing wave $\epsilon 1$ (solid line).

Electrodes L1 and L2 are used as the vibration detection electrodes. As shown in FIG. 11, electrode L1 is sized equivalent to the $\frac{1}{4}$ wavelength from $\frac{1}{2}$ to $\frac{1}{2}$ wavelength and centered at the $\frac{3}{8}$ wavelength position of the second wave of standing wave $\tau$. Electrode L2 is sized equivalent to the $\frac{1}{4}$ wavelength from $\frac{1}{2}$ to $\frac{3}{4}$ wavelength of the second wave of standing wave $\tau$, and is positioned centered at the $\frac{5}{8}$ wavelength position. In other words, the position corresponding to the period between the high and low peaks of one of the two standing waves is divided into two equal parts of $\frac{1}{4}$ wavelength each, and the vibration detection electrodes are positioned corresponding to these $\frac{1}{4}$ wavelength periods.

It is to be noted that alternatively the $\frac{1}{2}$-wavelength period between transition points can be divided into two equal parts of $\frac{1}{4}$ wavelength each, and the vibration detection electrodes positioned corresponding to these $\frac{1}{4}$ wavelength periods.

Note also that while the vibration detection electrodes are positioned relative to the second wave in the above description, the same effect can be obtained when positioned relative to the first or third wave.

The output signals obtained from the charges induced in electrodes L1 and L2 are separately detected by the method shown in FIG. 5 to obtain the amplitude of vibrator vibration, and the detected amplitude values are summed by the adder. In this embodiment the peak values of the signals output from electrodes L1 and L2 are both converted to DC voltages expressing the magnitude of vibration generated in the vibrator. These current values are added by the adder and output to the control circuit. The control circuit uses this sum as an index for controlling the drive circuit to output a drive signal for driving the moving body at the desired rotational speed.

The ratio of the detected amplitude signal sum during counterclockwise rotation of the moving body to the sum during clockwise rotation is 1, and, as in the case shown in FIG. 6, is not dependent upon the offset of the vibration detection electrodes L1 and L2 to the standing wave.

Figure 12:
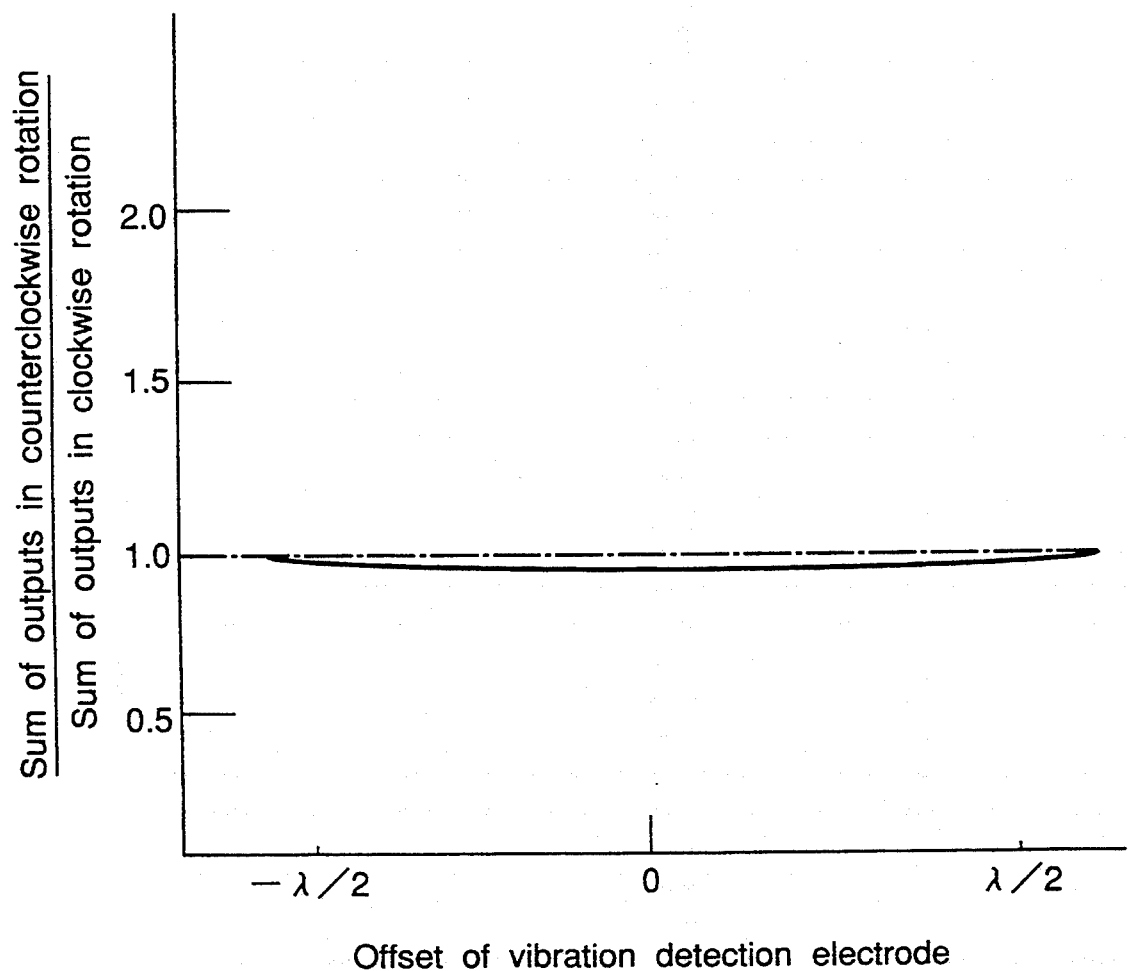
FIG. 12 is a graph of the vibration detection results in the ultrasonic motor according to the second embodiment of the invention.

FIG. 12 shows the relationship between the physical offset of the vibration detection electrodes L1 and L2 to the standing waves, and the ratio between the amplitude sum signals during clockwise and counterclockwise rotation. More specifically, this is the ratio between the sum of the amplitude detection circuit output signals, which are obtained from the output signals from the vibration detection electrodes L1 and L2, during clockwise rotation to the sum of the amplitude detection circuit output signals during counterclockwise rotation when the time-based shift $\delta t$ differs with the direction of rotation.

While the sum ratio is not 1.0 when the physical offset is 0, it is extremely close to 1.0. As a result, the sum can be treated as nearly constant irrespective of the direction of rotation and the physical offset of the vibration detection electrodes even when a standing wave component remains in the elastic travelling wave, and can therefore be used as an index for controlling the rotational speed to the desired value with good precision.

An ultrasonic motor and control method providing extremely stable, high precision rotational speed control can thus be provided without precisely positioning the vibration detection electrodes to the standing wave as a means of eliminating the effect of residual standing wave components in the elastic travelling wave on vibration detection.

Embodiment 3

The third embodiment of the invention is described below with reference to the accompanying figures.

Figure 13:
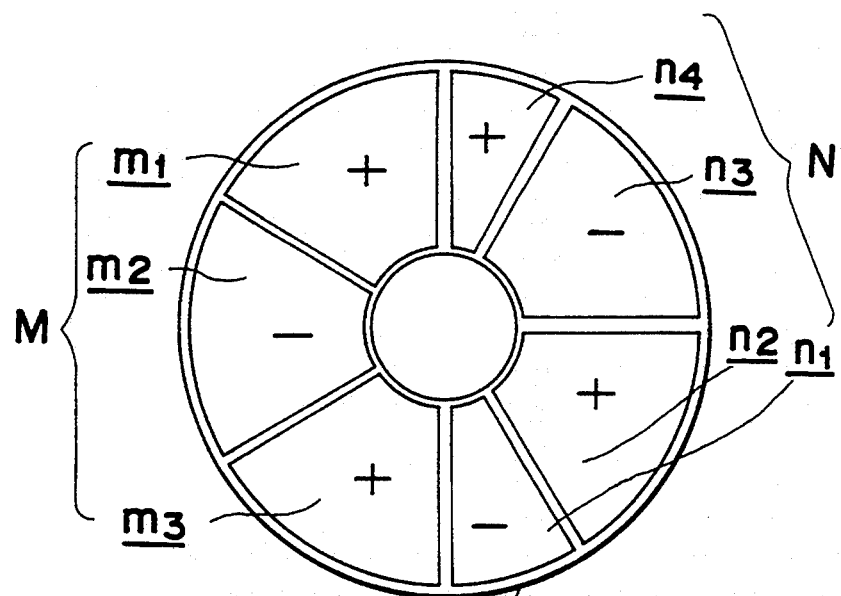
FIG. 13 is a plan view of side one of the piezoelectric body in a disk-shaped ultrasonic motor according to the third embodiment of the present invention.
Figure 14:
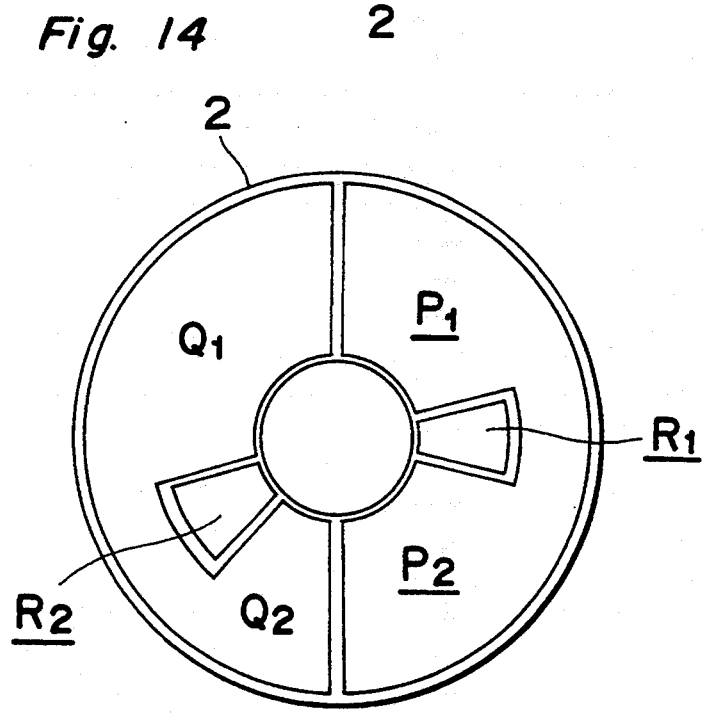
FIG. 14 is a plan view of side two of said piezoelectric body.

FIG. 13 is a plan view of side 1 of the piezoelectric body 2 in the disk-shaped ultrasonic motor, and FIG. 14 is a plan view of side 2 of the piezoelectric body 2. Fundamental and third mode flexural vibrations are excited in the radial and circumferential directions of the disk-shaped vibrator, respectively.

Figure 15:
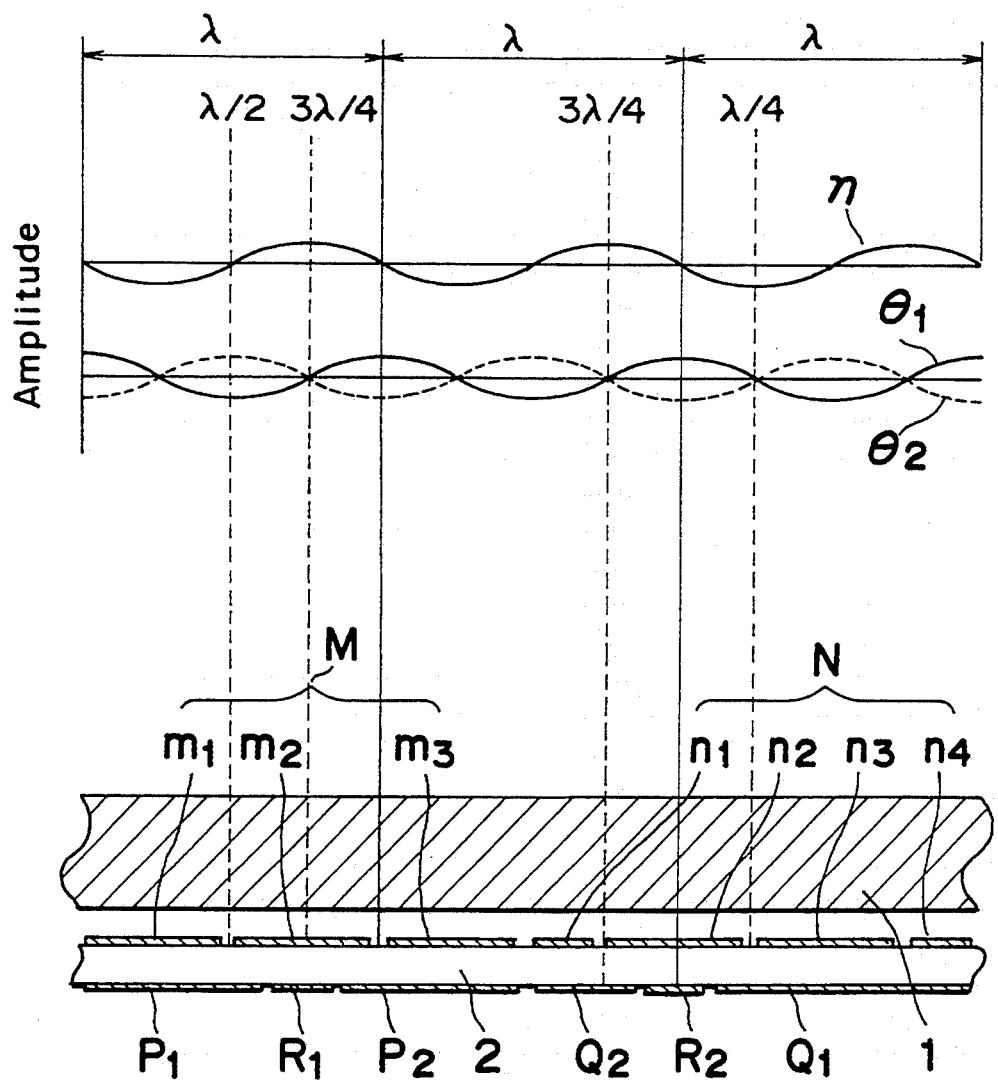
FIG. 15 shows the relationship between the standing waves and piezoelectric body of the ultrasonic motor according to the third embodiment of the invention.

FIG. 15 includes a cross section of the piezoelectric body 2 and elastic base 1, and a wave diagram of the standing waves excited by the drive electrodes of the piezoelectric body 2; $\lambda$ indicates the wavelength of the standing wave.

Referring to FIG. 13, side 1 of the piezoelectric body 2 comprises electrode groups M and N with a phase difference equivalent to $\frac{1}{4}$ wavelength of the standing wave. Electrode group M comprises electrode members m1, m2, and m3, each equivalent to $\frac{1}{2}$ of the travelling wave wavelength. Electrode group N comprises electrode members n2 and n3 equivalent to $\frac{1}{2}$ of the travelling wave wavelength, and electrode members n1 and n4 equivalent to $\frac{1}{4}$ of the travelling wave wavelength.

Referring to FIG. 14, side 2 of the piezoelectric body 2 comprises electrodes P1, P2 and electrodes Q1, Q2, each electrode pair connected at the outside circumference thereof, and electrodes R1 and R2 corresponding to $\frac{1}{4}$ of the standing wave wavelength at the inside circumference of the piezoelectric body.

Side 1 electrode groups M and N are positioned according to electrodes P1, P2 and Q1, Q2 of side 2. Specifically, if side 1 (as seen in FIG. 10(a)) was turned over and placed against side 2 (FIG. 10(b)), electrode group M would be opposite electrodes P1, P2, and electrode group N would be opposite electrodes Q1, Q2.

Side 2 of the piezoelectric body 2 functions as the common electrode by being placed in contact with a metal conductor, and the piezoelectric body 2 is polarized as indicated in FIG. 13 by means of electrode groups M and N of side 1. Note that polarization is not limited to the pattern shown in FIGS. 13 and 14.

After polarization, the piezoelectric body 2 is bonded to the elastic base 1 using side 1 as the adhesion interface, thus forming the vibrator 3.

When electrical signals with a 90° time-base phase difference are applied to electrodes P1, P2 and Q1, Q2, respectively, two different-phase standing waves $\eta$ (solid line) and $\theta 1$ (solid line) will ideally be excited, thus inducing fundamental and third mode flexural vibrations in the radial and circumferential directions of the elastic base 1. Standing wave $\theta 2$ (dotted line) occurs when the drive signal applied to electrode group N has a $-90°$ time-base phase difference, thus causing the moving body to rotate in the opposite direction.

Electrodes R1 and R2 are used as the vibration detection electrodes. As shown in FIG. 15, electrode R1 is sized equivalent to the $\frac{1}{4}$ wavelength from $\frac{5}{8}$ to $\frac{7}{8}$ wavelength and centered at the $\frac{3}{4}$ wavelength position of the first wave of standing wave $\eta$. Electrode R2 is sized equivalent to the $\frac{1}{4}$ wavelength from $\frac{7}{8}$ wavelength of the second wave to $\frac{1}{8}$ wavelength of the third wave of standing wave $\eta$, centered at the beginning of the third wave. In other words, electrode R1 is the $\frac{1}{4}$ wavelength vibration detection electrode centered at a high peak of the first standing wave $\theta 1$, and electrode R2 is the $\frac{1}{4}$-wavelength vibration detection electrode centered at a high peak of the second standing wave $\theta 2$.

In an ultrasonic motor comprising a piezoelectric body as shown in FIGS. 13 and 14, the rotational speed is controlled by detecting the amplitude of vibration from the vibration detection electrode output signals by means of the amplitude detection circuit, and using the output signal sum as an index for drive signal control. This makes it possible to obtain a control index independent of the direction of rotation and unaffected by residual standing wave components in the travelling wave and physical offsets between the electrode and detection wave positions (see FIGS. 6 and 7).

Note that the vibration detection electrodes R1 and R2 are nonadjacent in nearly-opposing positions on the piezoelectric body. Vibration wave distortion and residual standing wave components occur in both the circumferential and radial directions. It is also possible that the center points of the piezoelectric body and elastic base become offset, resulting in non-concentric alignment. In the case of the present embodiment, primary vibration is excited in the radial direction as shown in FIG. 37. As a result, the amplitude of vibration increases near the outside circumference. In a piezoelectric body with adjacent vibration detection electrodes, the detection signal output from one of the vibration detection electrodes increases or decreases as the concentricity of alignment decreases. As a result, the vibration detection result varies with the accuracy of concentricity in different ultrasonic motors.

However, if the vibration detection electrodes are provided in non-adjacent, nearly-opposing positions as in the present embodiment, the output from the one vibration detection electrode decreases as the output from the other vibration detection electrode increases. When these output values are added, a nearly constant sum is obtained. As a result, this electrode pattern both compensates for physical offsets in the electrode pattern around the circumference, and eliminates the affects of radial offsets.

Drive electrodes P1, P2 and Q1, Q2 are physically separated. Connection to external circuitry is simplified, however, by connecting these electrode pairs at the outside circumference. In addition, when the primary vibration mode is in the radial direction as in this embodiment, vibration is greatest at the outside circumference, and the outside circumference area generates high drive power. By connecting the electrodes at the outside circumference, an even greater drive power can be generated.

It is to be noted that the method of connecting the electrodes at the outside circumference area shall not be limited to that described above.

It is therefore possible by means of the present embodiment to provide an ultrasonic motor whereby the rotational speed can be precisely controlled while retaining a high drive power without being affected by residual standing wave components and positioning offsets in the electrodes.

Embodiment 4

The fourth embodiment of the invention is described below with reference to the accompanying figures.

Figure 16:
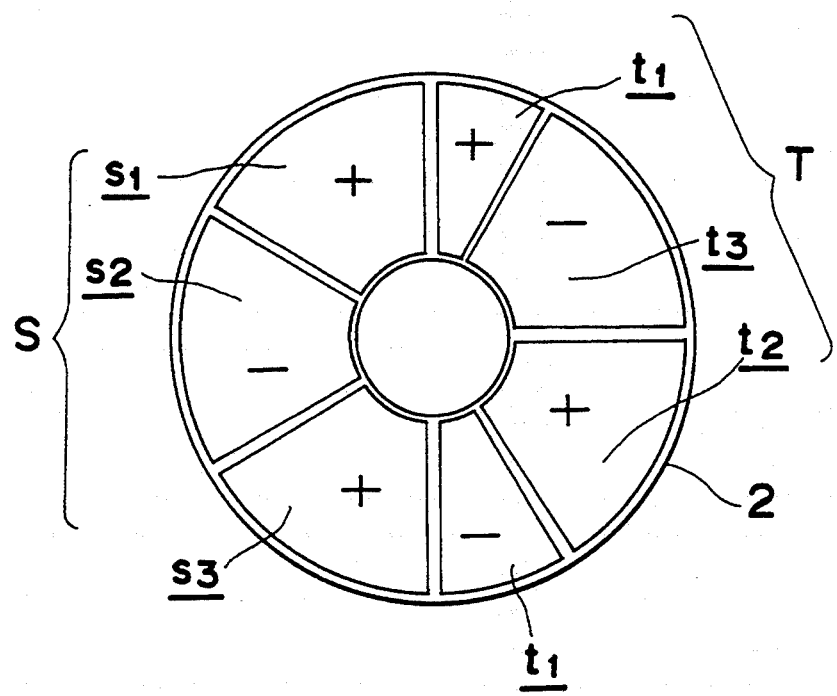
FIG. 16 is a plan view of side one of the piezoelectric body in a disk-shaped ultrasonic motor according to the fourth embodiment of the present invention.
Figure 17:
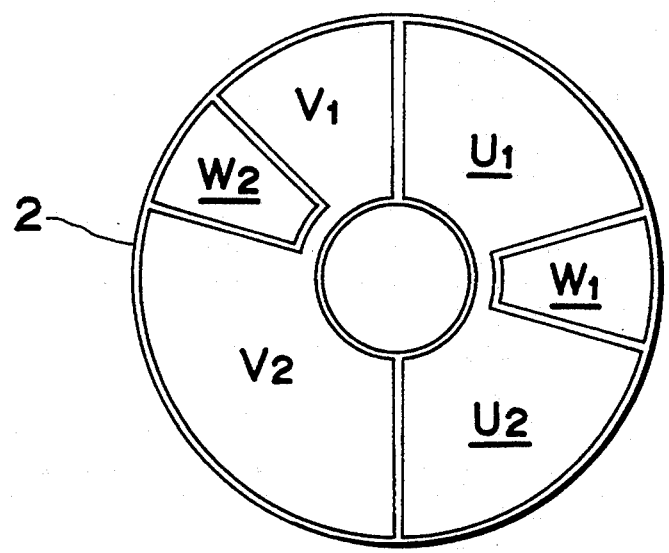
FIG. 17 is a plan view of side two of said piezoelectric body.

FIG. 16 is a plan view of side 1 of the piezoelectric body 2 in the disk-shaped ultrasonic motor, and FIG. 17 is a plan view of side 2 of the piezoelectric body 2. Fundamental and third mode flexural vibrations are excited in the radial and circumferential directions of the disk-shaped vibrator, respectively.

Figure 18:
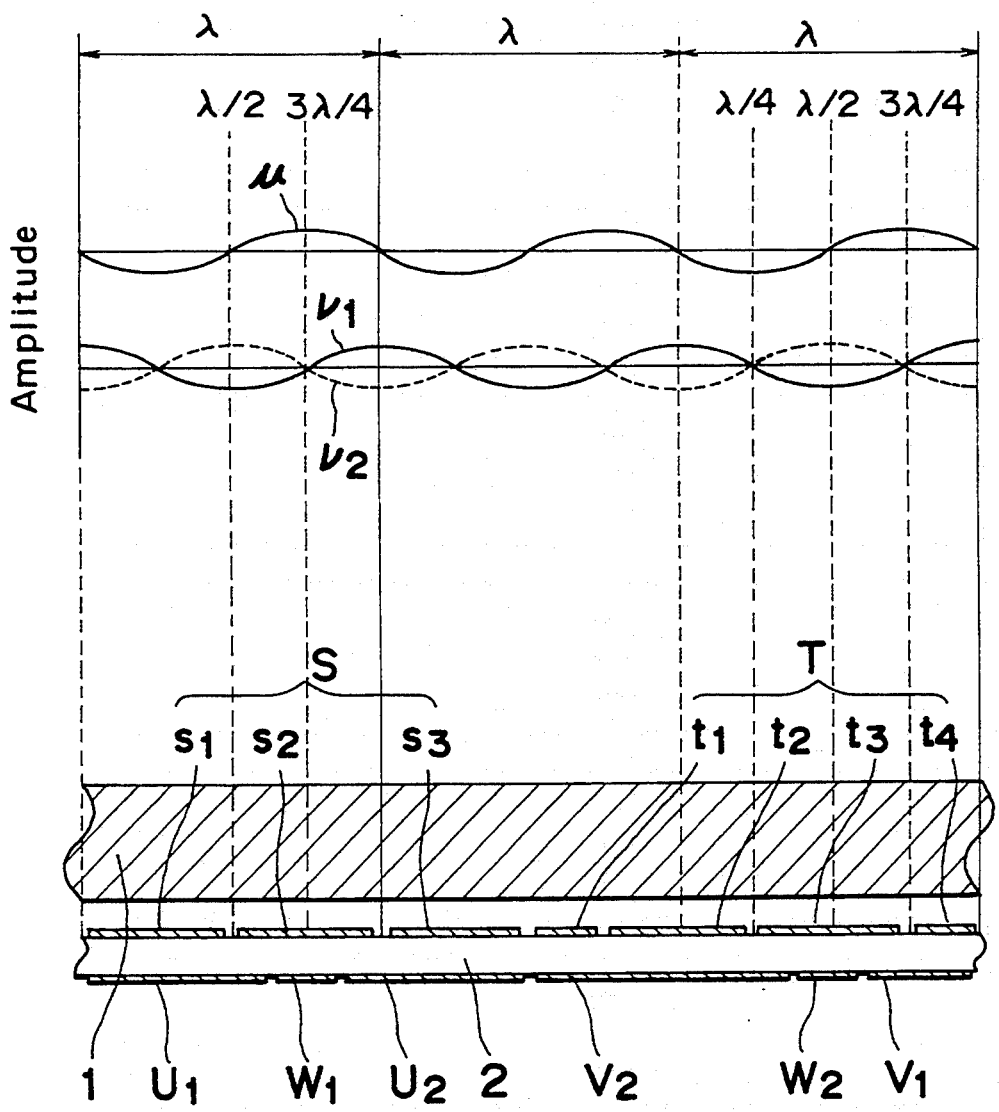
FIG. 18 shows the relationship between the standing waves and piezoelectric body of the ultrasonic motor according to the fifth embodiment of the invention.

FIG. 18 includes a cross section of the piezoelectric body 2 and elastic base 1, and a wave diagram of the standing waves excited by the drive electrodes of the piezoelectric body 2; $\lambda$ indicates the wavelength of the standing wave.

Referring to FIG. 16, side 1 of the piezoelectric body 2 comprises electrode groups T and S with a phase difference equivalent to $\frac{1}{4}$ wavelength of the standing wave. Electrode group S comprises electrode members s1, s2, and s3, each equivalent to $\frac{1}{2}$ of the travelling wave wavelength. Electrode group T comprises electrode members t2 and t3 equivalent to $\frac{1}{2}$ of the travelling wave wavelength, and electrode members t1 and t4 equivalent to $\frac{1}{4}$ of the travelling wave wavelength.

Referring to FIG. 17, side 2 of the piezoelectric body 2 comprises electrodes U1, U2 and electrodes V1, V2, each electrode pair connected at the inside circumference thereof, and electrodes W1 and W2 corresponding to $\frac{1}{4}$ of the standing wave wavelength at the outside circumference of the piezoelectric body.

Side 1 electrode groups S and T are positioned according to electrodes U1, U2 and V1, V2 of side 2. Specifically, if side 1 (as seen in FIG. 16) was turned over and placed against side 2 (FIG. 17), electrode group S would be opposite electrodes U1, U2, and electrode group T would be opposite electrodes V1, V2.

Side 2 of the piezoelectric body 2 functions as the common electrode by being placed in contact with a metal conductor, and the piezoelectric body 2 is polarized in the thickness direction as indicated in FIG. 16 by means of electrode groups S and T of side 1. Note that polarization is not limited to the pattern shown in FIGS. 16 and 17.

After polarization, the piezoelectric body 2 is bonded to the elastic base 1 using side 1 as the adhesion interface, thus forming the vibrator 3.

When electrical signals with a 90° time-base phase difference are applied to electrodes U1, U2 and V1, V2, respectively, two different-phase standing waves $\mu$ (solid line) and $\nu1$ (solid line) will ideally be excited, as shown in FIG. 18, thus inducing fundamental and third mode flexural vibrations in the radial and circumferential directions of the elastic base 1. Standing wave $\nu2$ (dotted line) occurs when the drive signal applied to electrode group T has a $-90°$ time-base phase difference, thus causing the moving body to rotate in the opposite direction.

Electrodes W1 and W2 are used as the vibration detection electrodes. As shown in FIG. 18, electrode W1 is sized equivalent to the $\frac{1}{4}$ wavelength from $\frac{5}{8}$ to $\frac{7}{8}$ wavelength and centered at the $\frac{3}{4}$ wavelength position of the first wave of standing wave $\mu$. Electrode W2 is sized equivalent to the $\frac{1}{4}$ wavelength from $\frac{3}{8}$ to $\frac{5}{8}$ wavelength of the third wave of standing wave $\mu$, centered at the $\frac{1}{2}$-wavelength position. In other words, electrode W1 is the $\frac{1}{4}$ wavelength vibration detection electrode centered at a high peak of the first standing wave $\mu$, and electrode W2 is the $\frac{1}{4}$ wavelength vibration detection electrode centered at a low peak of the second standing wave $\nu$. Note that the positions of electrodes W1 and W2 shall not be limited to the first and third wave positions above, and can be positioned relative to the second wave.

In an ultrasonic motor comprising a piezoelectric body as shown in FIGS. 16 and 17, the rotational speed is controlled by detecting the amplitude of vibration from the vibration detection electrode output signals by means of the amplitude detection circuit, and using the output signal sum as an index for drive signal control. This makes it possible to obtain a control index independent of the direction of rotation and unaffected by residual standing wave components in the travelling wave and physical offsets between the electrode and detection wave positions (see FIGS. 6 and 7).

Drive electrodes U1, U2 and V1, V2 are physically separated. Connection to external circuitry at a single point for each electrode pair is simple even in a small diameter piezoelectric body, however, by internally connecting these electrode pairs at the inside circumference area. In addition, when the primary vibration mode is in the radial direction as in this embodiment, vibration is greatest at the outside circumference. Therefore, because vibration in this area is small even when the inside circumference area is used for drive electrode connection, the vibration detection electrode output signal level does not become too low when the vibration detection electrodes are provided at the outside circumference area, and no control-related problems occur.

It is to be noted that the method of connecting at the inside circumference area shall not be limited to that described above, and a linear connection can also be used. It is also possible to connect the drive electrode pairs U1, U2 and V1, V2 at both inside and outside circumference areas, separating the vibration detection electrodes connected at the middle with two signal leads taken from each vibration detection electrode.

Because the vibration detection electrodes W1 and W2 are provided in non-adjacent, nearly-opposing positions in this embodiment as in the third embodiment above, this electrode pattern both compensates for physical offsets in the electrode pattern around the circumference, and eliminates the effects of radial offsets.

It is therefore possible by means of the present embodiment to provide an ultrasonic motor whereby a high vibration detection signal level can be retained, the drive signal can be easily input, and the rotational speed can be precisely controlled without being affected by residual standing wave components and positioning offsets in the electrodes.

Embodiment 5

The fifth embodiment of the invention is described below with reference to the accompanying figures.

Figure 19:
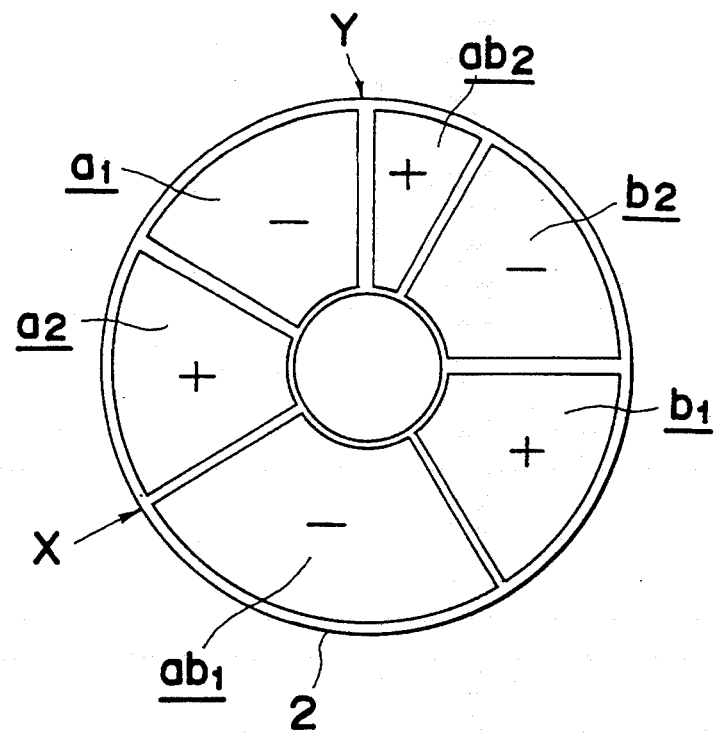
FIG. 19 is a plan view of side one of the piezoelectric body in a disk-shaped ultrasonic motor according to the fifth embodiment of the present invention.
Figure 20:
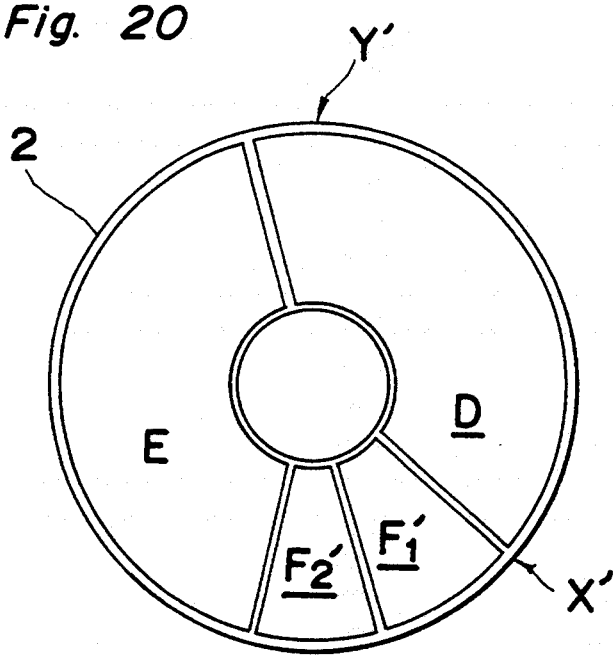
FIG. 20 is a plan view of side two of said piezoelectric body.

FIG. 19 is a plan view of side 1 of the piezoelectric body 2 in the disk-shaped ultrasonic motor, and FIG. 20 is a plan view of side 2 of the piezoelectric body 2. Note that lines X and Y in FIG. 19 align with lines X' and Y' in FIG. 20 in the completed piezoelectric body 2. Thus, the electrode structure shown in FIGS. 19 and 20 yields the same standing wave and vibration detection electrode relationship shown in FIGS. 2 and 3. Side 2 of the piezoelectric body 2 is identical to side 2 of the piezoelectric body 2 in the first embodiment above and shown in FIG. 3. Electrode elements a3 and b4 and electrodes C1 and C2 on side 1 of the piezoelectric body 2 in the first embodiment (FIG. 2) are combined into a single electrode ab1, and electrode members a4 and b3 (FIG. 2) are combined into a single electrode ab2 (FIG. 19).

By polarizing the electrodes as indicated in FIG. 19, and applying AC voltages with a 90° time-base phase difference to electrodes D and E, primary and tertiary elastic travelling waves are obtained in the radial direction. The same radial direction, primary and tertiary elastic travelling waves are obtained when the polarization is reversed.

As shown in FIG. 4, electrode F1 (FIG. 20) is sized equivalent to the ¼ wavelength from ⅜ to ⅝ wavelength of the second wave of standing wave α, and is positioned centered at the end of the first ¼ wavelength of this second wave. Electrode F2 is sized equivalent to the ¼ wavelength from ⅜ to ⅝ wavelength of the second wave of standing wave α, and is centered at the ½ wavelength point. In other words, the vibration detection electrodes are positioned corresponding to a ¼ wavelength period of the standing wave, and are respectively centered on the low peaks of the two standing waves α and β.

As with an ultrasonic motor using a piezoelectric body With the electrode pattern shown in FIGS. 2 and 3, the output signals of the electrodes F1 and F2 are input to the amplitude detection circuits, the amplitude detection signals are summed, and the resulting sum signal is used to stably control the rotational speed of the moving body without being affected by residual standing wave components or electrode position offsets (see the block diagram in FIG. 5) because of this relationship between the physical position of the electrodes F1 and F2 and the standing waves.

With the electrode pattern shown in FIG. 19, electrode ab2 is equivalent to ¼ wavelength of the elastic travelling wave, and the other electrodes are equivalent to ½ wavelength. Because there are no ⅛ wavelength equivalent electrodes as in the electrode pattern shown in FIGS. 2 and 3, and the electrodes are large, polarization is simple, and cracking of the piezoelectric body during polarization can be reduced.

Using a piezoelectric body according to the present embodiment described above, the electrode area available for polarization is large and polarization is thus simplified while significantly reducing damage to the piezoelectric body during polarization. In addition to these benefits, application of this piezoelectric body yields an ultrasonic motor enabling precise rotational speed control unaffected by residual standing wave components and any offset in the electrode positions.

Embodiment 6

The sixth embodiment of the invention is described below with reference to the accompanying figures.

Figure 21:
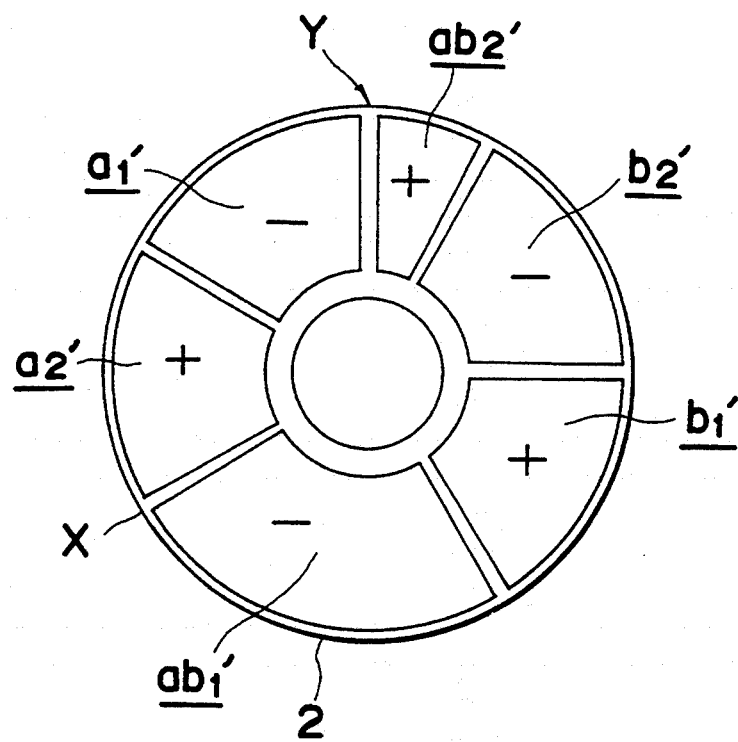
FIG. 21 is a plan view of side one of the piezoelectric body in a disk-shaped ultrasonic motor according to the sixth embodiment of the present invention.
Figure 22:
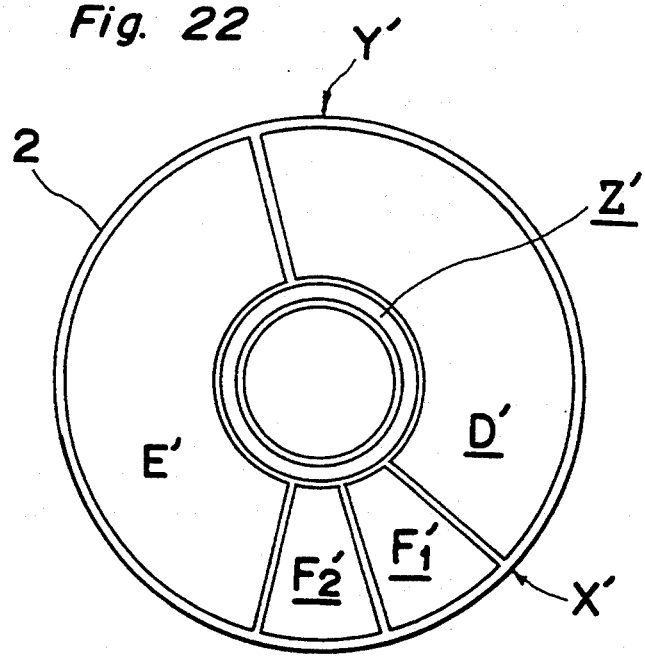
FIG. 22 is a plan view of side two of said piezoelectric body.

FIG. 21 is a plan view of side 1 of the piezoelectric body 2 in the disk-shaped ultrasonic motor, and FIG. 22 is a plan view of side 2 of the piezoelectric body 2. Note that lines X and Y in FIG. 21 align with lines X' and Y' in FIG. 22 in the completed piezoelectric body 2. Thus, the electrode structure shown in FIG. 15 yields the same standing wave and vibration detection electrode relationship shown in FIG. 4.

This embodiment differs from the fifth embodiment in the provision of a ring-shaped electrode Z at the inside circumference of side 2 of the piezoelectric body 2. The size of the other electrodes on side 2 is thus reduced by the size of this electrode Z, but the circumferential positions and relationship to the standing waves are otherwise identical to those obtained with the electrode pattern shown in FIG. 20.

The side 1 electrode pattern is also identical to that shown in FIG. 19 except for the exclusion of electrodes from the area corresponding to electrode Z at the inside circumference.

This ring-shaped electrode Z is used as the common electrode, and is connected to the elastic base.

A common electrical potential used as a reference is required to apply the signal to the piezoelectric body. While the elastic base is commonly made of a metal body and this metal body is used as the common potential, plural lead wires must be connected to the metal body if there is no common electrode. In addition, connection may not be easy depending upon the type of metal used for the metal body. By providing a common electrode on the piezoelectric body and connecting this common electrode to the elastic base using a conductive paste, a common potential can be easily obtained without using an excessively long lead wire.

Note that the polarization pattern shall not be limited to that shown in FIGS. 21 and 22.

In addition, the polarization electrodes may be near the inside circumference.

Because vibration at the inside circumference where the common electrode Z is provided is smallest and has negligible impact on motor drive, drive power and vibration detection are not affected by the drive electrodes and vibration detection electrodes not extending to the inside circumference of the piezoelectric body.

As in the fifth embodiment above, the vibration detection electrodes F1' and F2' shown in FIG. 22 have the same relationship to the standing waves shown in FIG. 4. As with an ultrasonic motor using a piezoelectric body with the electrode pattern shown in FIGS. 2 and 3, the output signals of the electrodes F1' and F2' are input to the amplitude detection circuits, the amplitude detection signals are summed, and the resulting sum signal is used to stably control the rotational speed of the moving body without being affected by residual standing wave components or electrode position offsets (see the block diagram in FIG. 5) because of this relationship between the physical position of the electrodes F1' and F2' and the standing waves.

By providing the common electrode at the inside circumference of the piezoelectric body in this embodiment, a common potential can be easily obtained, and an ultrasonic motor enabling precise rotational speed control unaffected by residual standing wave components and any offset in the electrode positions can be provided.

Figure 23:
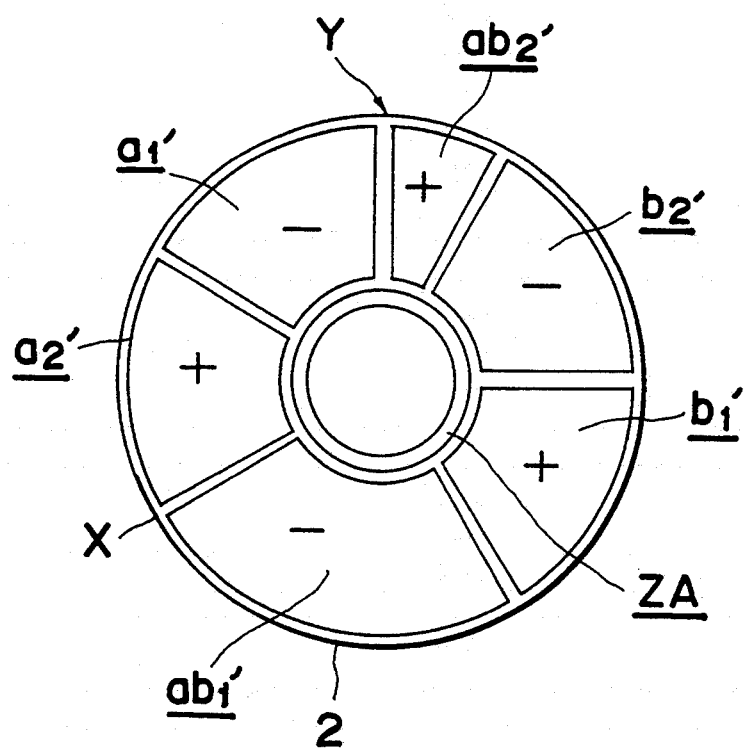
FIG. 23 is a plan view of side one of the piezoelectric body in a disk-shaped ultrasonic motor according to the sixth embodiment of the present invention.
Figure 24:
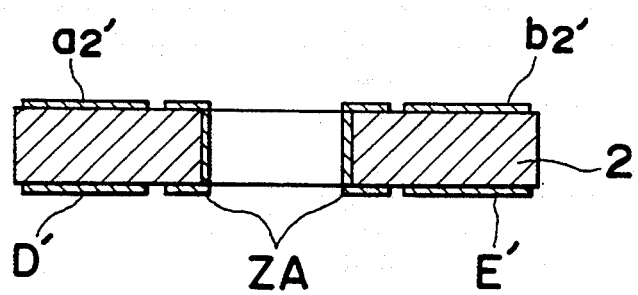
FIG. 24 is cross section of said piezoelectric body.

FIGS. 23 and 24 show an alternative embodiment of a piezoelectric body comprising a common electrode.

Figure 25:
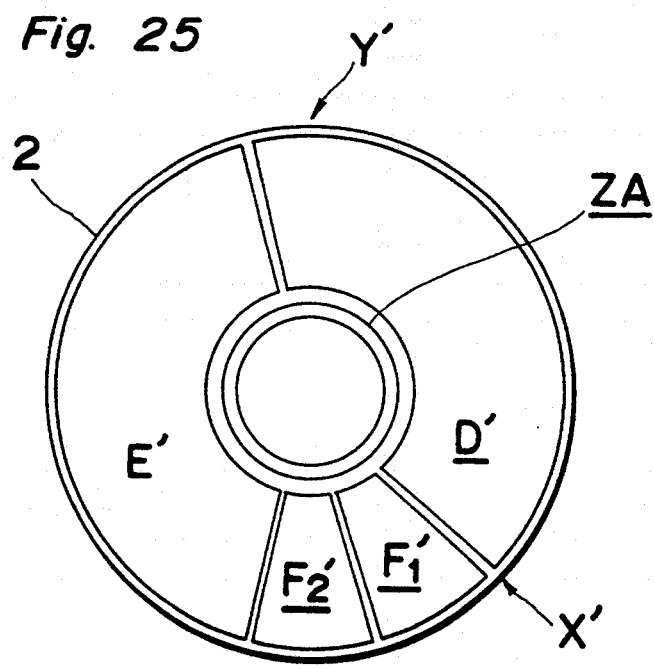
FIG. 25 is a plan view of side two of said piezoelectric body.

FIG. 23 is a plan view of side 1 of the piezoelectric body 2 in the disk-shaped ultrasonic motor, FIG. 24 is cross section of said piezoelectric body, and FIG. 25 is a plan view of side two of said piezoelectric body. Note that lines X and Y in FIG. 23 align with lines X' and Y' in FIG. 25 in the completed piezoelectric body 2. Thus, the electrode structure shown in FIGS. 23, 24 and 25 yields the same standing wave and vibration detection electrode relationship shown in FIG. 4.

Figure 26:
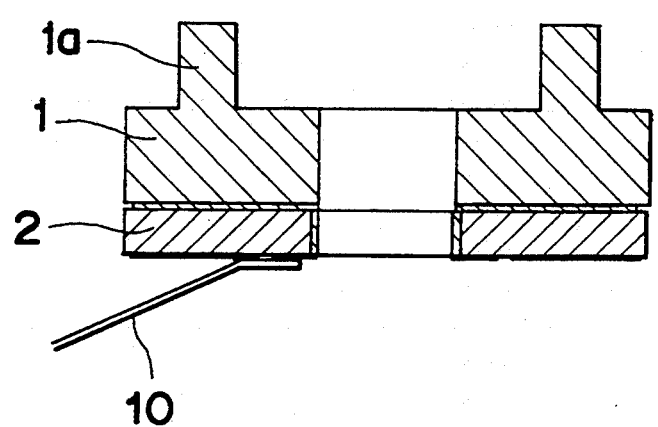
FIG. 26 shows the method of obtaining a lead from the piezoelectric body.

Note that the electrode configurations shown in FIGS. 23 and 25 are essentially identical to the configuration shown in FIGS. 21 and 22. The difference is that the electrode ZA at the inside circumference is common to both sides 1 and 2 as shown in the cross section in FIG. 24. As a result, this common electrode ZA can be electrically connected to the elastic base 1 by bonding side 1 of the piezoelectric body 2 to the elastic base 1 as in the case shown in FIG. 3. As shown in FIG. 26, it is possible to simply connect electrodes D', E', F1', F2', and ZA to the external circuitry by means of flexible lead 10 after bonding the piezoelectric body 2 to the elastic base 1. It is to be noted that the means of connecting the electrodes to the external circuitry shall not be so limited.

By thus connecting the common electrode to the two main sides of the piezoelectric body, an ultrasonic motor with fewer manufacturing steps can be achieved in addition to the benefits described in the second embodiment above.

Embodiment 7

The seventh embodiment of the invention is described below with reference to the accompanying figures.

This embodiment describes the method of selecting the output signals from the vibration detection electrodes. The electrode configuration of the piezoelectric body of the disk-shaped ultrasonic motor is as shown in FIGS. 9 and 10, and the vibration induced in the vibrator is as shown in FIG. 11.

When electrical signals with a 90° time-base phase difference are applied to electrodes J and K, standing wave $\gamma$ is excited by electrode J, and standing wave $\epsilon 1$ (solid line) is excited by electrode K. Standing wave $\epsilon 2$ (dotted line) is excited when the electrical signal applied to electrode K has a −90° time-base phase difference to the electrical signal applied to electrode J.

When standing wave $\gamma$ is excited by electrode J and standing wave $\epsilon 1$ is excited by electrode K, standing wave $\gamma$ and standing wave $\epsilon 1$ have a 90° phase difference while the wave amplitude has the same sign in both signals. The charge detected by electrode L1 is therefore the sum of the charge induced by standing wave $\gamma$ and the charge induced by standing wave $\epsilon 1$.

At electrode L2, however, standing wave $\gamma$ and standing wave $\epsilon 1$ have a 90° time-base phase difference and the same amplitude level but a different sign. As a result, the charge induced by standing wave $\gamma$ and the charge induced by standing wave $\epsilon 1$ are mutually cancelling.

When standing wave $\gamma$ is excited by electrode J and standing wave $\epsilon 2$ is excited by electrode K, standing wave $\gamma$ and standing wave $\epsilon 2$ have a 90° phase difference while the wave amplitude is in the same direction in electrode L2. The charge detected by electrode L2 is therefore the sum of the charge induced by standing wave $\gamma$ and the charge induced by standing wave $\epsilon 2$.

At electrode L1, however, standing wave $\gamma$ and standing wave $\epsilon 2$ have a 90° time-base phase difference and the same amplitude level but a different sign. As a result, the charge induced by standing wave $\gamma$ and the charge induced by standing wave $\epsilon 2$ are mutually cancelling.

Thus, if the signal from electrode L1 is selected when the elastic travelling wave induced in the vibrator 3 is produced by standing wave $\tau$ and standing wave $\epsilon 1$ according to the direction of travel (rotation), and the signal from electrode L2 is selected when the elastic travelling wave is produced by standing wave $\gamma$ and standing wave $\epsilon 2$, load changes occurring between electrodes J and K can be detected during ultrasonic motor drive, and a stable drive characteristic can be maintained.

Figure 27:
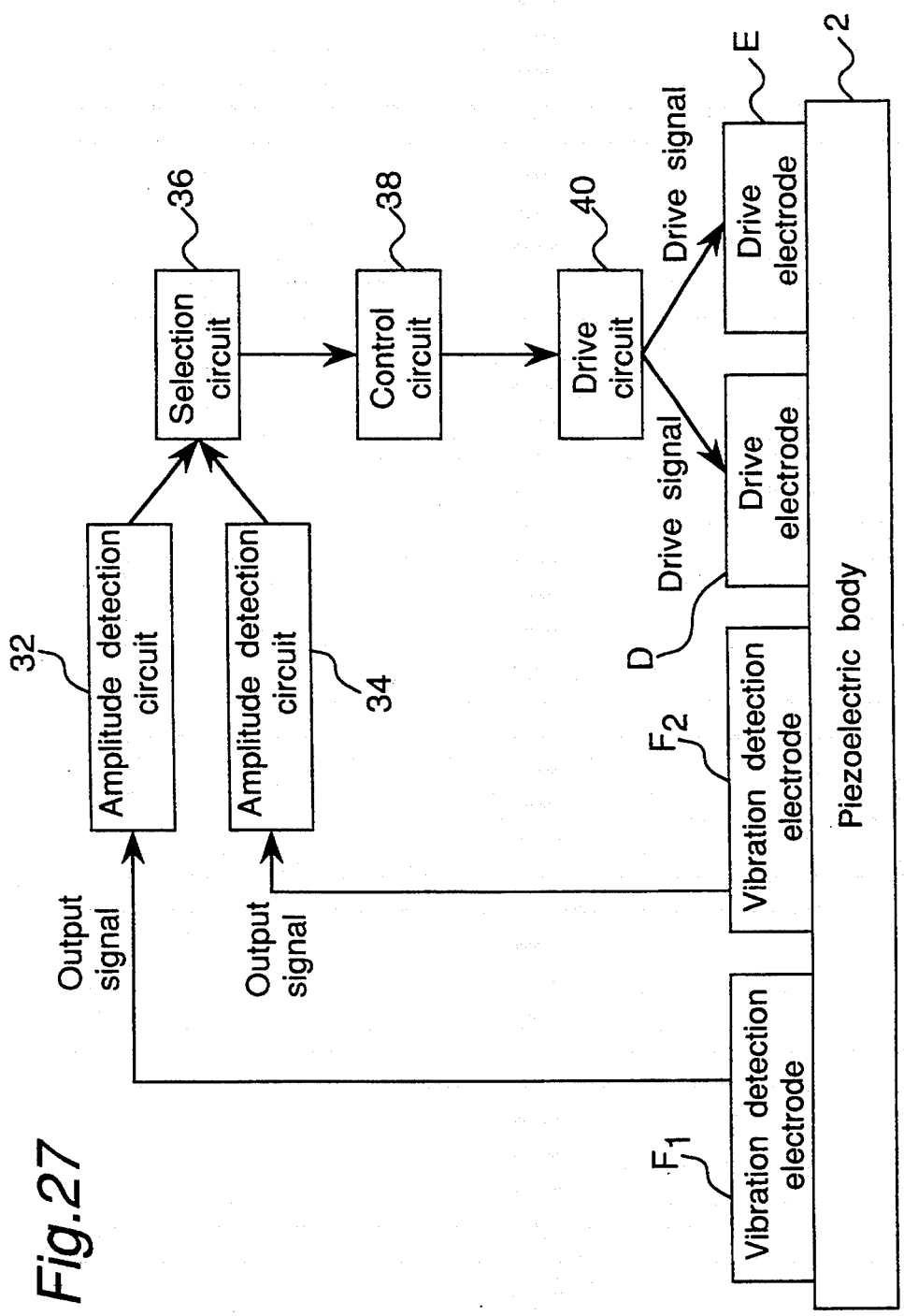
FIG. 27 is a block diagram of the control method of the ultrasonic motor according to the seventh embodiment of the invention.
Figure 28:
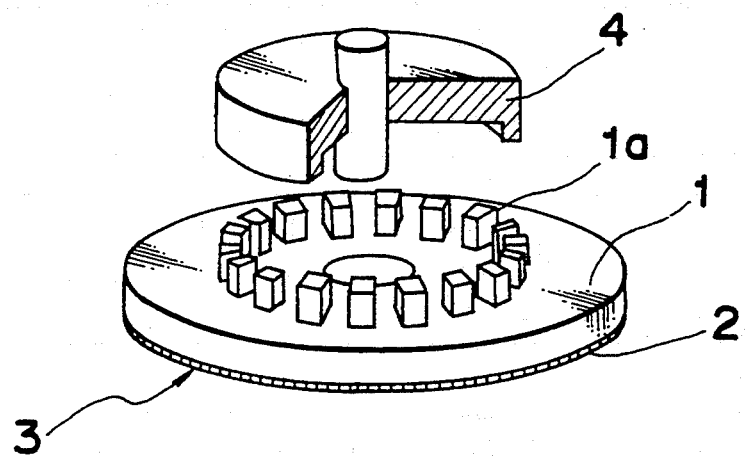
FIG. 28 is a partially cut-away view of a conventional disk-shaped ultrasonic motor.
Figure 29:
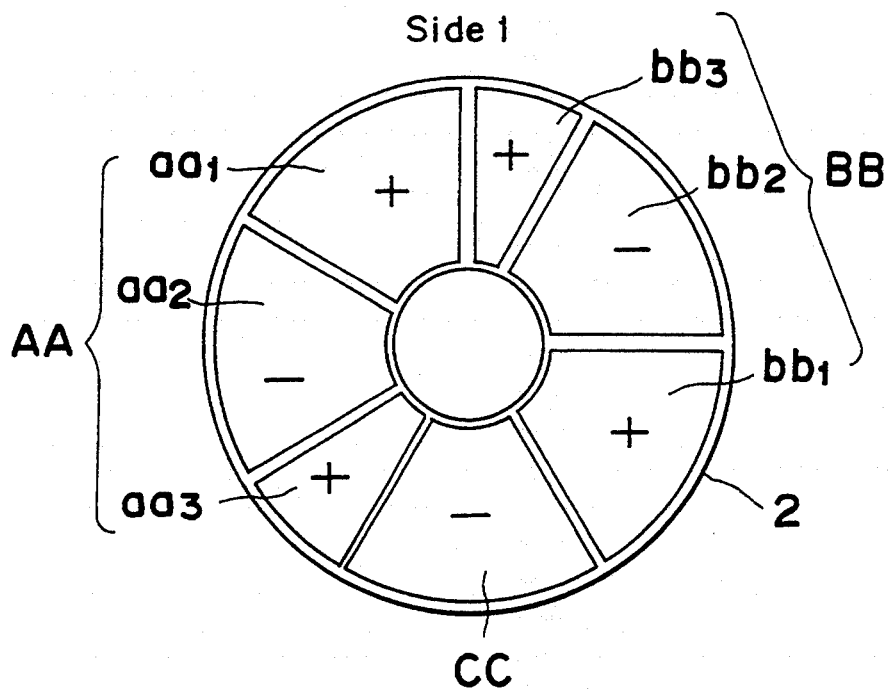
FIG. 29 is a plan view showing the electrode structure of side one of the piezoelectric body in the conventional disk-shaped ultrasonic motor shown in FIG. 28.
Figure 30:
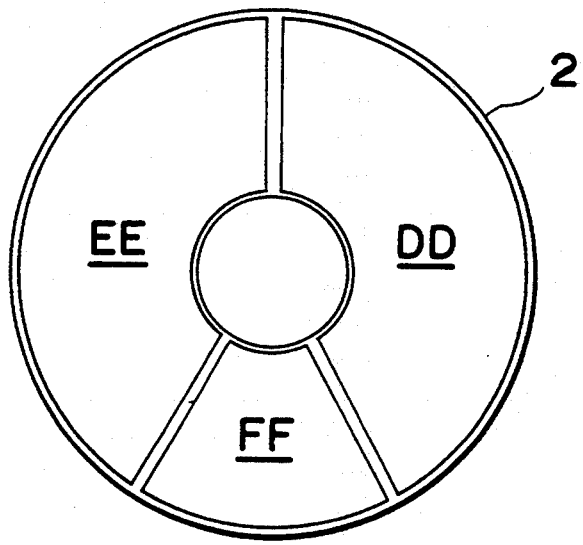
FIG. 30 is a plan view of side 2 of said piezoelectric body.
Figure 31:
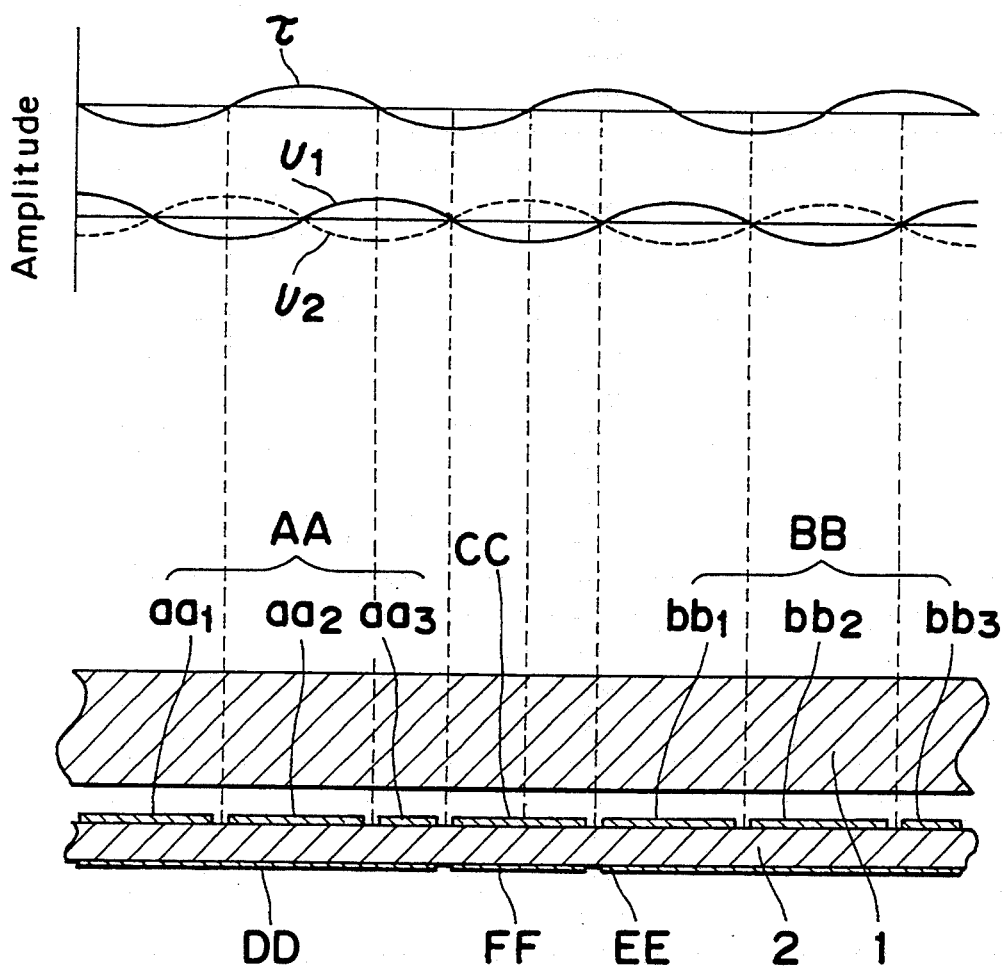
FIG. 31 shows the relationship between the standing waves and the piezoelectric body of the conventional ultrasonic motor with the electrode structure shown in FIGS. 29 and 30.
Figure 32:
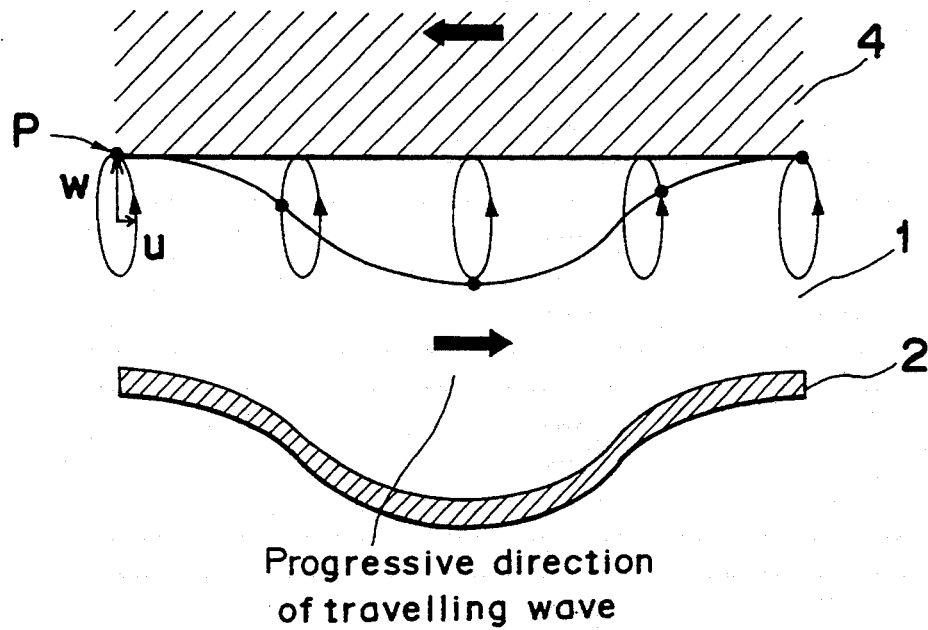
FIG. 32 shows the operating principle of the ultrasonic motor.
Figure 33:
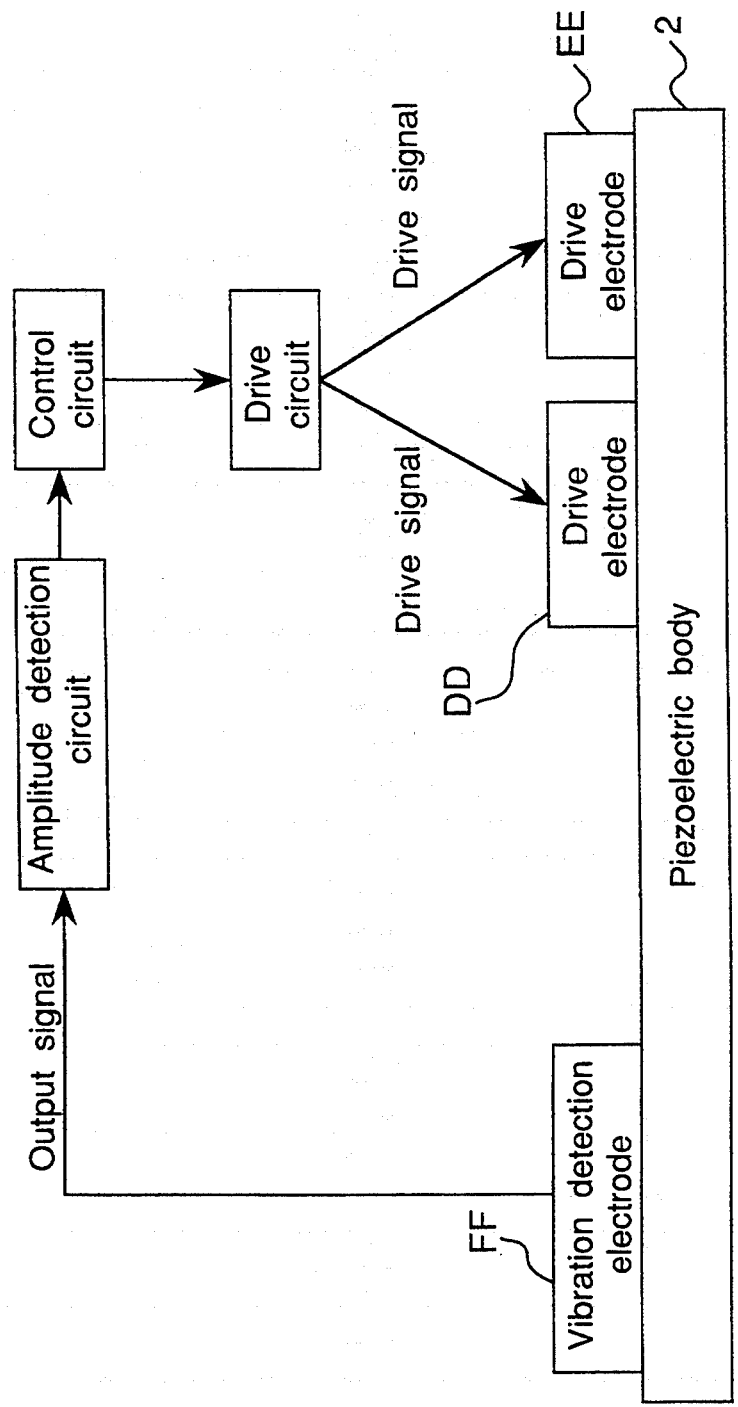
FIG. 33 is a block diagram of the control method of a conventional ultrasonic motor.

A block diagram of the control circuit according to this embodiment is shown in FIG. 27. The outputs from the vibration detection electrodes are input to the vibration amplitude detection circuits 32 and 34. The amplitude detection circuit outputs are input to a selector 36 for selection according to the direction of rotation. The selected amplitude signal is output to a control circuit 38 by the selector 36, and the control circuit 38 uses this signal to control a drive circuit and the rotational speed.

Note that the same effect can be obtained by varying this configuration. For example, a circuit for directly selecting one output signal from the vibration detection electrodes L1 and L2 according to the direction of rotation can be placed before the amplitude detection circuit. In this case, the selected vibration detection electrode output is passed through to the amplitude detection circuit for amplitude detection, and the detected amplitude value is input to the control circuit. Other configurations are also possible.

It is thus possible to obtain a large drive electrode area even while providing a vibration detection member on the piezoelectric body, and to select the vibration detection signal based on the direction of travel of the elastic travelling wave induced in the vibrator. By applying this piezoelectric body in an ultrasonic motor, an ultrasonic motor characterized by stable operation and good drive efficiency can be obtained.

It is to be noted that while the various embodiments of the present invention have been described with respect to a disk-shaped ultrasonic motor using fundamental and third mode flexural vibrations propagated in the radial and circumferential directions of the disk, the present invention is also valid when applied in a ring type ultrasonic motor using circular flexural vibration. In addition to the $\delta t$ component producing residual standing wave components as shown in equation 5, a similar effect can be obtained by the invention with respect to the $\delta x$ and m components, and a sufficient effect can be obtained even when these components overlap.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An ultrasonic motor comprising:
a vibrating body comprising a elastic body and a piezoelectric body adhered to said elastic body, said piezoelectric body being electrically polarized in a direction of the thickness thereof to have a predetermined polarization pattern in a circumferencial direction thereof;

a moving body press-contacted against said vibrating body by a biasing means via a friction element;

plural drive electrodes arranged on one principal plane of said piezoelectric body;

a drive circuit for generating drive signals applied to said plural drive electrodes to generate two standing waves having an identical angular frequency and a phase difference equivalent to $\pi/2$ or $3\pi/2$, said two standing waves inducing an elastic travelling wave in said vibrating body which causes rotation of said moving body;

first and second vibration detection electrodes arranged at respective positions on said one principal plane of said piezoelectric body for detecting vibrations at said respective positions of said vibrating body;

first and second vibration amplitude detection means for detecting vibration amplitudes at said respective positions of said vibrating body using output signals from said first and second vibration detection electrodes;

an adder for summing said first and second vibration amplitudes detected by said first and second vibration amplitude detection means; and a control circuit for controlling said drive circuit to control rotation of said vibrating body using a value output from said adder as an index of control according to a predetermined relationship between a sum of said first and second vibration amplitudes and the rotation of said vibrating body.

2. The ultrasonic motor according to claim 1 in which said first and second vibration detection electrodes are arranged in a circumferencial direction of said piezoelectric body so as to detect charges induced at positions shifted from each other by an angle equivalent to a phase difference of $\pi/2$ or $3\pi/2$ between said two standing waves.

3. The ultrasonic motor according to claim 1 in which said first and second vibration detection electrodes include first and second vibration detection electrodes arranged at positions corresponding to a loop and a node of one of said two standing waves, respectively.

4. The ultrasonic motor according to claim 1 in which said first and second vibration detection electrodes include first and second vibration detection electrodes arranged within one wavelength of said standing wave symmetrically with respect to a loop or a node of said standing wave.

5. The ultrasonic motor according to claim 1 in which said first and second vibration detection electrodes are arranged in a radially inside area of said one principal plane of said piezoelectric body.

6. The ultrasonic motor according to claim 1 in which said piezoelectric motor further comprises a common electrode on at least one principal plane thereof which is electrically connected to an external common potential.

7. The ultrasonic motor according to claim 1 in which said piezoelectric motor further comprises
common electrodes arranged on respective principal planes thereof which are electrically connected to each other by a connection means arranged at a radially inside portion of said piezoelectric body.

8. A control method for controlling an ultrasonic motor in which a moving body press-contacted to a vibrating body is moved by an elastic travelling wave excited in said vibrating body by generating two standing waves having phases which are different from each other by driving a piezoelectric body adhered to said vibrating body by AC voltages, comprising steps of:

obtaining plural output signals from plural vibration amplitude detection electrodes which are arranged at respective positions of said vibrating body and which detect plural vibrations at said respective positions of said vibrating body;

converting said plural output signals to plural magnitude signals indicating respective magnitudes of said plural vibrations of said vibrating body at said respective positions;

adding said plural magnitude signals; and controlling a rotation of said ultrasonic motor using a value obtained by adding said plural magnitude signals in accordance with a predetermined relationship between a sum of said plural magnitude signals and said rotation of said ultrasonic motor.

9. A control method for controlling an ultrasonic motor in which a moving body press-contacted to a vibrating body is moved by an elastic travelling wave excited in said vibrating body by generating two standing waves having phases which are different from each other by driving a piezoelectric body adhered to said vibrating body by AC voltages, comprising steps of:

obtaining plural output signals from plural vibration amplitude detection electrodes which are arranged at respective positions of said vibrating body and which detect plural vibrations at said respective positions of said vibrating body;

converting said plural output signals to plural magnitude signals indicating respective magnitudes of said plural vibrations of said vibrating body at said respective positions;

selecting one of said plural magnitude signals according to a direction of movement of said moving body; and controlling a rotation of said ultrasonic motor using the selected one of said plural magnitude signals in accordance with a predetermined relationship between said plural magnitude signals and said rotation of said ultrasonic motor.

10. A control method for controlling an ultrasonic motor in which a moving body press-contacted to a vibrating body is moved by an elastic travelling wave excited in said vibrating body by generating two standing waves having phases which are different from each other by driving a piezoelectric body adhered to said vibrating body by AC voltages, comprising steps of:

providing plural vibration amplitude detection electrodes which are arranged at respective positions of said vibrating body and which detect plural vibrations at said respective positions of said vibrating body;

selecting one of said plural vibration amplitude detection electrodes according to a direction of movement of said moving body;

converting an output signal from the selected vibration amplitude detection electrode to a value indicating the magnitude of vibration at a respective position of said vibrating body; and controlling a rotation of said ultrasonic motor using the magnitude of vibration obtained at the converting step in accordance with a predetermined relationship between said magnitude signal and said rotation of said ultrasonic motor.

11. The ultrasonic motor according to claim 2 in which said first and second vibration detection electrodes include first and second vibration detection electrodes arranged at positions corresponding to a loop and a node of one of said two standing waves, respectively.

12. The ultrasonic motor according to claim 2 in which said first and second vibration detection electrodes include first and second vibration detection electrodes arranged within one wavelength of said standing wave symmetrically with respect to a loop or a node of said standing wave.

13. The ultrasonic motor according to claim 2 in which said first and second vibration detection electrodes are arranged in a radially inside area of said one principal plane of said piezoelectric body.

14. An ultrasonic motor as claimed in claim 1, wherein said control circuit has stored therein information indicative of said predetermined relationship between the sum of said first and second vibration amplitudes and a rotational speed of said vibrating body, and wherein said control circuit is for comparing a set rotational speed of said vibrating body with said predetermined relationship to obtain an associated sum of said first and second vibration amplitudes and for controlling said drive circuit to generate said drive signals so as to cause said adder to output a value corresponding to said associated sum of said first and second vibration amplitudes.

15. An ultrasonic motor as claimed in claim 1, wherein each of said vibration amplitude detection means is for outputting a DC voltage corresponding to a peak-to-peak value of the output signal from a respective one of said first and second vibration detection electrodes.

16. An ultrasonic motor as claimed in claim 14, wherein each of said vibration amplitude detection means is for outputting a DC voltage corresponding to a peak-to-peak value of the output signal from a respective one of said first and second vibration detection electrodes.

17. A control method as claimed in claim 8, further comprising storing in advance information indicative of said predetermined relationship between the sum of said plural vibration amplitudes and a rotational speed of said vibrating body, and wherein said controlling step includes comparing a set rotational speed of said vibrating body with said stored predetermined relationship to obtain an associated sum of said plural vibration amplitudes and controlling said AC voltages so as to cause the value obtained in said adding step to correspond to said associated sum of said plural vibration amplitudes.

18. A method as claimed in claim 8, wherein said plural magnitude signals are DC voltages respectively corresponding to peak-to-peak values of said plural output signals.

19. A method as claimed in claim 17, wherein said plural magnitude signals are DC voltages respectively corresponding to peak-to-peak values of said plural output signals.

20. A method as claimed in claim 9, wherein said plural magnitude signals are DC voltages respectively corresponding to peak-to-peak values of said plural output signals.

21. A method as claimed in claim 10, wherein said magnitude signal is a DC voltage corresponding to a peak-to-peak value of said output signal.

* * * * *